US008086807B2

(12) United States Patent
Okada et al.

(10) Patent No.: US 8,086,807 B2
(45) Date of Patent: Dec. 27, 2011

(54) BACKUP DATA MANAGEMENT METHOD IN WHICH DIFFERENTIAL COPY TIME IS TAKEN INTO ACCOUNT

(75) Inventors: Wataru Okada, Yokohama (JP); Masayasu Asano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 687 days.

(21) Appl. No.: 12/254,872

(22) Filed: Oct. 21, 2008

(65) Prior Publication Data

US 2010/0058012 A1   Mar. 4, 2010

(30) Foreign Application Priority Data

Sep. 4, 2008   (JP) .................................. 2008-227228

(51) Int. Cl.
 *G06F 12/16* (2006.01)
(52) U.S. Cl. .. 711/162; 711/112; 711/165; 711/E12.103
(58) Field of Classification Search ........................ None
See application file for complete search history.

(56) References Cited

U.S. PATENT DOCUMENTS

| 7,152,146 | B2  | 12/2006 | Satoyama et al. | |
|---|---|---|---|---|
| 7,581,061 | B2* | 8/2009 | Miyagaki et al. | 711/114 |
| 2005/0210210 | A1* | 9/2005 | Arai et al. | 711/162 |
| 2005/0257014 | A1* | 11/2005 | Maki et al. | 711/162 |
| 2006/0129771 | A1* | 6/2006 | Dasgupta et al. | 711/162 |
| 2006/0184733 | A1 | 8/2006 | Yamamoto et al. | |
| 2007/0162716 | A1* | 7/2007 | Yagisawa et al. | 711/162 |
| 2007/0180208 | A1* | 8/2007 | Yamasaki | 711/162 |
| 2008/0091898 | A1* | 4/2008 | Takahashi et al. | 711/162 |
| 2008/0282048 | A1* | 11/2008 | Miura | 711/162 |
| 2009/0055608 | A1* | 2/2009 | Yamasaki | 711/162 |

FOREIGN PATENT DOCUMENTS

| JP | 2000-293317 | 10/2000 |
|---|---|---|
| JP | 2001-331378 | 11/2001 |
| JP | 2005-018185 | 1/2005 |

* cited by examiner

*Primary Examiner* — Pierre-Michel Bataille
*Assistant Examiner* — Ralph A Verderamo, III
(74) *Attorney, Agent, or Firm* — Antonelli, Terry, Stout & Kraus, LLP.

(57) ABSTRACT

Provided is a computer system, comprising a storage system and a management computer. The management computer manages differential copy start times, differential data amounts of first pairs, and a data amount that can be copied in differential copy per unit time; identifies one of the first pairs for which the differential copy is to be started and a start time of the differential copy; subtracts the data amount of differential copy per unit time that is allocated to the identified one of the first pairs from a differential data amount of the identified first pairs; add the unit time to the identified start time; judges that the differential copy has been finished at a time when the subtracted differential data amount reaches zero or less; and calculates time zones in which the first pairs execute differential copy based on the time at which differential copy has been finished.

11 Claims, 17 Drawing Sheets

| 2001 | 2002 | 2003 | 2004 | 1253 |
|---|---|---|---|---|
| STORAGE ID | PARITY GROUP ID | DIFFERENTIAL RECEPTION RATE | USE | |
| STG1 | PG1 | 100MB/min | EXCLUSIVELY SECONDARY VOL | |
| STG1 | PG1 | 100MB/min | EXCLUSIVELY SECONDARY VOL | |
| STG1 | PG2 | 200MB/min | MIXED | |
| ... | ... | ... | ... | |

PARITY GROUP INFORMATION

FIG. 2

| 3001 | 3002 | 3003 | 3004 | 3005 | 1254 |
|---|---|---|---|---|---|
| STORAGE ID | LOGICAL VOL | PARITY GROUP | CAPACITY | ALLOCATION | |
| STG1 | VOL01 | PG1 | 100GB | UNUSED | |
| STG1 | VOL02 | PG1 | 100GB | SECONDARY VOL | |
| STG1 | VOL03 | PG2 | 100GB | SECONDARY VOL | |
| ... | ... | ... | ... | ... | |

LOGICAL VOLUME CONFIGURATION INFORMATION

FIG. 3

APPLICATION INFORMATION

BACKUP POLICY INFORMATION

| COPY PAIR ID | PRIMARY VOL STORAGE | PRIMARY VOL | SECONDARY VOL STORAGE | SECONDARY VOL |
|---|---|---|---|---|
| Pair 1 | STG 1 | VOL 11 | STG 1 | VOL 21 |
| Pair 2 | STG 1 | VOL 12 | STG 1 | VOL 22 |
| Pair 3 | STG 1 | VOL 13 | STG 1 | VOL 23 |
| ... | ... | ... | ... | ... |

COPY PAIR INFORMATION

FIG. 6

| DIFFERENTIAL COPY PROCESSING TIME MAINTAINING PROCESSING CYCLE | SIMULATION TIME |
|---|---|
| 5min | 7 DAYS |

SETTING PROGRAM INFORMATION

FIG. 7

| COPY PAIR ID | BACKUP START TIME | DIFFERENTIAL DATA AMOUNT | UNDER DIFFERENTIAL COPY | COMPLETION CHECK UNNECESSARY FLAG | START TIME | COMPLETION TIME |
|---|---|---|---|---|---|---|
| COPY PAIR 1 | EVERYDAY AT 8:00 | 600MB | NO | OFF | N/A | N/A |
| COPY PAIR 2 | EVERYDAY AT 8:30 | 600MB | NO | OFF | N/A | N/A |
| COPY PAIR 3 | EVERYDAY AT 9:45 | 600MB | NO | OFF | N/A | N/A |

12000 12010 12020 12030 12040 12050 12060

TRANSITION IN DIFFERENTIAL DATA AMOUNT OF COPY PAIR 1

TRANSITION IN DIFFERENTIAL DATA AMOUNT OF COPY PAIR 2

TRANSITION IN DIFFERENTIAL DATA AMOUNT OF COPY PAIR 3

EXTERNAL STORAGE INFORMATION

| EXTERNAL STORAGE ID | DIFFERENTIAL RECEPTION RATE | USE |
|---|---|---|
| STG2 | 100MB/min | EXCLUSIVELY SECONDARY VOL |
| STG2 | 100MB/min | EXCLUSIVELY SECONDARY VOL |
| STG2 | 200MB/min | MIXED |
| | | |

FIG. 19

EXTERNAL VOLUME CONFIGURATION INFORMATION

| STORAGE ID | LOGICAL VOL | EXTERNAL STORAGE ID | CAPACITY | ALLOCATION |
|---|---|---|---|---|
| STG1 | VOL01 | STG2 | 100GB | UNUSED |
| STG1 | VOL02 | STG2 | 100GB | SECONDARY VOL |
| STG1 | VOL03 | STG2 | 100GB | SECONDARY VOL |
| ... | ... | ... | ... | ... |

FIG. 20

BACKUP DATA MANAGEMENT METHOD IN WHICH DIFFERENTIAL COPY TIME IS TAKEN INTO ACCOUNT

CLAIM OF PRIORITY

The present application claims priority from Japanese patent application JP 2008-227228 filed on Sep. 4, 2008, the content of which is hereby incorporated by reference into this application.

BACKGROUND

This invention relates to a computer system containing a storage system, and more particularly, to a differential copy setting method.

In a computer system in general where a plurality of host computers are run, one storage system is shared by the host computers to be run in a centralized manner, thereby reducing the running and management cost of the storage system. In the centralized storage system, input from and output to (I/O) the servers (host computers) concentrate in a single disk drive, and redundant array of inexpensive disks (RAID) is employed as a technology of speeding up I/O. RAID achieves quick I/O by grouping together a plurality of physical disks that are to be managed as one disk (parity group) and allowing the grouped physical disks to operate in parallel with one another. A computer system of this type usually partitions a parity group into a plurality of storage areas. The storage areas are referred to as "logical volumes" here.

A computer system can lose data through a breakdown of its storage system due to a disaster, a physical failure due to, for example, the expiration of the service life of a disk, data destruction by a computer virus, an operational mistake made by a user, and the like. Computer systems generally prepare for such data loss by backing up data periodically and using the backup data for restoration.

Storage systems that are attracting attention lately are ones having a function of copying data from a logical volume that is being used for business operation (primary volume) to another logical volume (secondary volume). This function enables a computer system to back up data stored in a logical volume without stopping the daily business operation. The pair consisting of the primary volume and the secondary volume is a "copy pair". Information indicating which logical volume is paired with which logical volume to form a copy pair is "copy pair configuration information". The relation between the secondary volume and a parity group to which the secondary volume belongs is a "parity group relevant to the copy pair".

A storage system as the one described above has a copy function with which data is backed up by copying every piece of data in the primary volume to the secondary volume after the volumes are paired as a copy pair, thereby making data in the primary volume and data in the secondary volume consistent (synchronized) with each other. After the synchronization, the business operation is started and the storage system merely records updated places where data is newly written in the primary volume, instead of executing copy between the primary volume and the secondary volume. When it is time to take a backup, data in the updated places alone is copied from the primary volume to the secondary volume based on the record of updated places. The storage system thus accomplishes fast backup (see, for example, JP 2001-331378 A). The data in the updated places to be copied is a "differential". Copying the differential data from the primary volume to the secondary volume is "differential copy".

The characteristics of a logical volume vary depending on the type of physical disks constituting its parity group (for example, disks coupled by fibre channel or disks coupled by serial advanced technology attachment (ATA)) and the RAID type (e.g., RAID level 1 or RAID level 2). It is therefore desirable to pair a primary volume with a secondary volume whose characteristics fit the primary volume as a copy pair.

Running a storage system in a centralized manner increases the count of logical volumes per storage system. This means that there are that much more logical volumes to choose from for the secondary volume of a backup-purpose copy pair, and makes it difficult to determine which logical volume as a secondary volume fits the primary volume.

As a technology of alleviating this problem, a method has been disclosed in which the computer system manages a table recording the characteristics of each logical volume to present appropriate secondary volume candidates to the user on the basis of the correlation between the characteristics of the primary volume and the characteristics of an unused logical volume (see JP 2005-18185 A, for example). This enables the user to choose a secondary volume that fits the primary volume from many logical volumes with ease.

Or the sophisticated storage system described above is equipped with other various functions. An example of those functions is related to relocation of data between physical disks within the storage system. With this function, the association of a logical volume that stores the data and that has been associated with the pre-relocation allocated place in a physical disk is switched to the post-relocation allocated place in a physical disk (see JP 2000-293317 A, for example). The data relocation is referred to as "data migration" here.

Generally speaking, a storage system backs up data periodically. When differential copy is started as part of data backup processing, backup data that has been stored in the secondary volume is destroyed by overwriting and can no longer be used. Data in the secondary volume cannot be used as new backup data, either, because it is incomplete until the differential copy is finished. In short, there is substantially no backup data in the secondary volume during differential copy. Data loss is therefore a possibility if a failure occurs in the primary volume during differential copy.

Also, requests to read data out of the primary volume which are issued during differential copy in order to extract a differential affect the business operation. In these and other various respects, it is desirable to keep differential copy processing time within a given period of time.

A storage system shared by a plurality of host computers prepares a copy pair for each host computer. In the case where the secondary volumes of the respective copy pairs belong to the same parity group, executing differential copy in the copy pairs at the same time causes the concentration of load on this parity group and accordingly prolongs the differential copy processing time.

This problem cannot be solved by the technology described in JP 2005-18185 A where candidates for the secondary volume are presented based only on the characteristics of a logical volume.

SUMMARY

This invention has been made in view of the above, and it is therefore an object of this invention to present a backup environment in which differential copy is finished within an acceptable differential copy processing time specified by a user, and to manage the backup environment such that the acceptable differential copy processing time is not exceeded during data backup operation. The parameters of backup environment are a backup start time (time at which data backup is started) and a copy pair (pair consisting of a primary volume and a secondary volume) used for the data backup.

The representative aspects of this invention are as follows. That is, there is provided a computer system, comprising: at least one storage system which includes a first storage area group of a plurality of first storage areas as a copy source and at least one second storage area group of a plurality of second storage areas as a copy destination, and executes differential copy in at least one first pair having the plurality of first storage areas and the plurality of second storage areas; and a management computer which manages the at least one storage system. The at least one storage system comprises an interface, storage devices coupled to the interface, a processor coupled to the interface, and a memory coupled to the processor. The management computer comprises an interface coupled to the at least one storage system, a processor coupled to the interface, and a memory coupled to the processor. The plurality of first storage areas are used by an application program executed by a host computer. A data amount of differential copy that can be executed per unit time is determined for the at least one second storage area group. The determined data amount of differential copy that can be executed per unit time is shared among first pairs in the at least one second storage area group. The management computer manages differential copy start times and differential data amounts of the first pairs, and manage for the at least one second storage area group a data amount that can be copied in differential copy per unit time; identifies one of the first pairs for which the differential copy is to be started and a start time of the differential copy; subtracts the data amount of differential copy per unit time that is allocated to the identified one of the first pairs from a differential data amount of the identified one of the first pairs; add the unit time to the identified start time; judges that the differential copy has been finished at a time when the subtracted differential data amount reaches zero or less; and calculates time zones in which the first pairs execute differential copy based on the time at which differential copy has been finished.

According to an embodiment of this invention, the backup environment can be created in which each copy pair finishes differential copy within the acceptable differential copy processing time.

BRIEF DESCRIPTION OF THE DRAWINGS

The present invention can be appreciated by the description which follows in conjunction with the following figures, wherein:

FIG. 2 is an explanatory diagram showing an example of the parity group information in accordance with the first embodiment of this invention;

FIG. 3 is an explanatory diagram showing an example of the logical volume configuration information in accordance with the first embodiment of this invention;

FIG. 6 is an explanatory diagram showing an example of the copy pair information in accordance with the first embodiment of this invention;

FIG. 7 is an explanatory diagram showing an example of the setting program information in accordance with the first embodiment of this invention;

FIG. 19 is an explanatory diagram showing an example of the external storage information 18001 in accordance with the third embodiment of this invention; and FIG. 20 is an explanatory diagram showing an example of the external volume configuration information in accordance with the third embodiment of this invention.

DETAILED DESCRIPTION OF THE PREFERRED EMBODIMENTS

An outline of this invention will be given first.

A management computer receives from a user a backup start time (time at which data backup is started) of each application program, configuration information of a copy pair used for the data backup, and an acceptable differential copy processing time, and collects from a storage system the differential amount (amount of data to be copied in differential copy) of each copy pair, configuration information of each logical volume, and the differential reception rate (amount of data that can be copied per unit time, (MB/min)) of each parity group. The management computer then identifies a parity group relevant to the copy pair based on the copy pair configuration information and the logical volume configuration information, and calculates from the differential reception rate of each parity group a processing time needed for each copy pair in the parity group to finish differential copy.

When the calculated processing time exceeds the acceptable differential copy processing time, the management computer changes one of the secondary volume of the copy pair and the backup start time, to thereby manage the backup environment in a manner that enables each copy pair to finish differential copy within the acceptable differential copy processing time.

To create a new copy pair, the management computer adds copy pairs with the secondary volume and the backup start time as variables to the backup environment of existing copy pairs, and then simulates differential copy to calculate a processing time needed for each copy pair to finish differential copy. Through the calculation, the management computer finds a secondary volume and a backup start time for the new copy pair that allow each copy pair to finish differential copy within an acceptable differential copy processing time, and presents the secondary volume and the backup start time to the user.

A detailed description will be given below with reference to FIGS. 1 to 20 on embodiments of this invention. The embodiments are not to limit this invention.

First Embodiment

Figure 1:
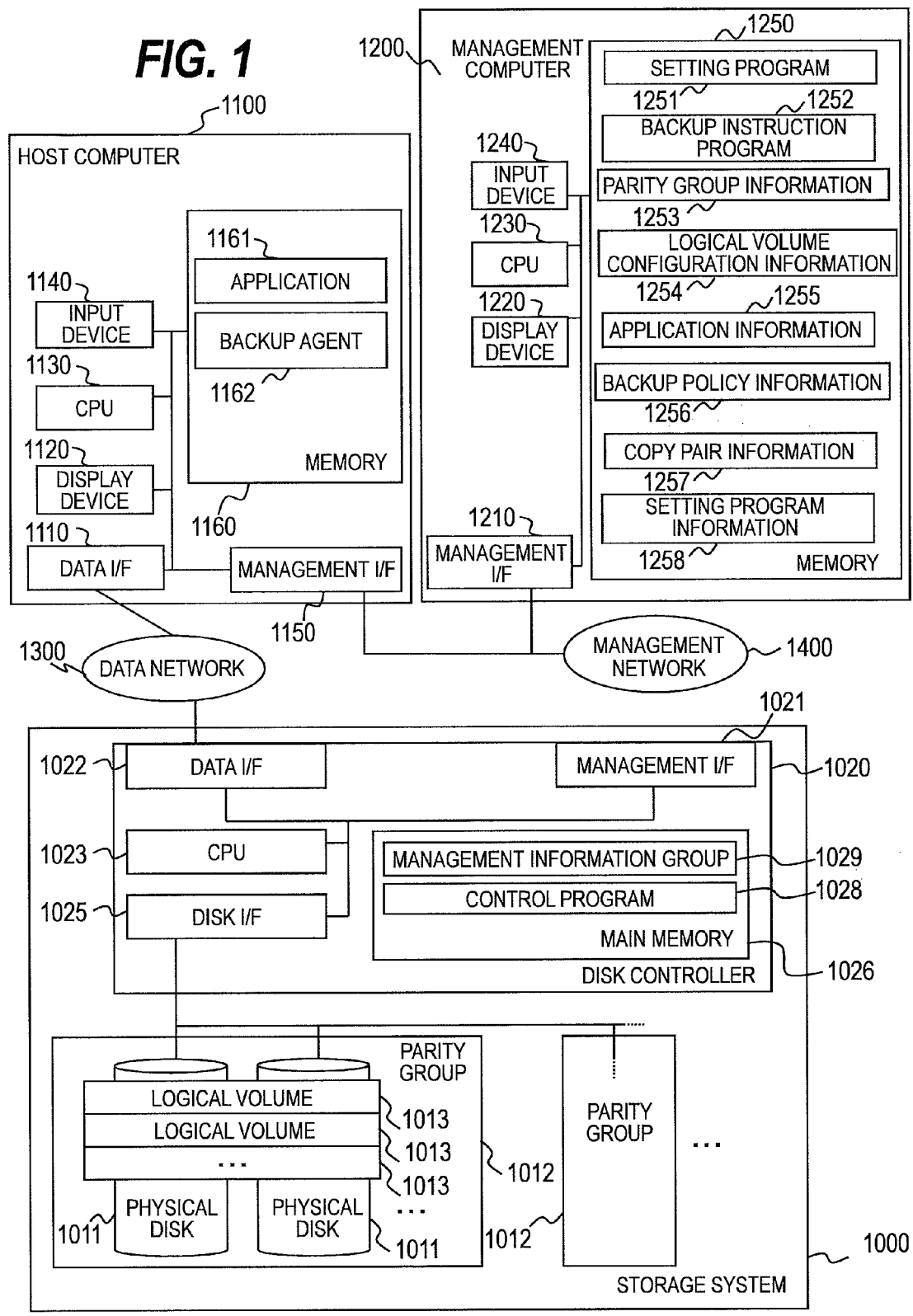
FIG. 1 is a block diagram showing an example of a configuration of a computer system in accordance with a first embodiment of this invention.

The following is a description on a first embodiment of this invention, specifically, the configuration and operation of a system according to the first embodiment.
System Configuration of the First Embodiment FIG. 1 is a block diagram showing an example of a configuration of a computer system according to the first embodiment of this invention.

The computer system includes at least one storage system 1000, at least one host computer 1100, and at least one management computer 1200. The storage system 1000 and the host computer 1100 are coupled to each other via a data network 1300. The data network 1300 is a storage area network (SAN) in the first embodiment, but may instead be an IP network or other data communication networks than the two.

The storage system 1000, the host computer 1100, and the management computer 1200 are coupled to one another via a management network 1400. The management network 1400 is an IP network in the first embodiment, but may instead be a storage area network (SAN) or other data communication networks than the two. The data network 1300 and the management network 1400 may be the same network, and the same computer may serve as the host computer 1100 and the management computer 1200. While FIG. 1 shows one storage system 1000, one host computer 1100, and one management computer 1200, there may be two or more of each.

The storage system 1000 is a storage system with volumes that store data used by an application program, and includes physical disks 1011 where the data is stored and a disk controller 1020 which controls components in the storage system 1000.

The physical disks 1011 are disk-type storage such as a hard disk drive. The physical disks 1011 may be other types of storage than a disk type, for example, a flash memory device.

The disk controller 1020 includes a data I/F 1022, a management I/F 1021, a disk I/F 1025, a main memory 1026, and a CPU 1023.

The main memory 1026 stores a management information group 1029 and a control program 1028. The CPU 1023 executes the control program 1028 stored in the main memory 1026. The following description is written as if processing is executed by a computer program, but it is actually a CPU running the computer program that executes the processing.

The control program 1028 groups a plurality of physical disks 1011 together to manage them as a parity group 1012. The control program 1028 partitions each parity group 1012 into logical volumes 1013.

The control program 1028 also manages various copy pairs that are used to take a backup. For instance, the control program 1028 stores a pair consisting of a primary volume and a secondary volume as a copy pair in the management information group 1029 according to a user's instruction. The control program 1028 copies every piece of data in the primary volume to the secondary volume as instructed by the user. The control program 1028 manages a differential between the primary volume and the secondary volume, and executes differential copy in a manner instructed by the user.

As mentioned in the background section, the control program 1028 has a function of relocating data so that data can migrate between parity groups. In response to requests made by the management computer 1200 and the host computer 1100, the control program 1028 processes data input/output in the logical volumes 1013 and sets configuration information and control information of components in the storage system 1000.

The configuration information contains the relation between a physical disk and a parity group and the relation between a parity group and a logical volume. The set configuration information is stored in the main memory 1026 as the entirety or part of the management information group 1029. The control program 1028 refers to or updates the configuration information included in the management information group 1029 in executing the above-mentioned various types of processing.

The data I/F 1022 is an interface to the data network 1300. The control program 1028 exchanges data and control commands with the host computer 1100 via the data I/F 1022.

The management I/F 1021 is an interface to the management network 1400. The control program 1028 exchanges data and control commands with the host computer 1100 and the management computer 1200 via the management I/F 1021. The disk I/F 1025 is an interface to the physical disks 1011. The control program 1028 exchanges data and control commands with the physical disks 1011 via the disk I/F 1025.

The host computer 1100 includes an input device 1140 such as a keyboard and a mouse, a CPU 1130, a display device 1120 such as a CRT, a memory 1160, a data I/F 1110, and a management I/F 1150.

The CPU 1130 executes programs stored in the memory 1160. The memory 1160 stores an application 1161 and a backup agent 1162. The application 1161 is an application program that uses the logical volumes 1013 of the storage system 1000, for example, a database management system (DBMS) or a file system.

The backup agent 1162 is a program that controls the operation of the application 1161 when data is backed up or restored. In the case of data backup, for example, the backup agent 1162 makes the application 1161 quiescent in order to store data used by the application 1161 in logical volumes while keeping data consistency. In the case of restoration, the backup agent 1162 stops the application 1161.

The backup agent 1162 also has a function of collecting information necessary for data backup and restoration from the host computer 1100 in response to a request made by a setting program 1251 of the management computer 1200 which will be described later. For example, the backup agent 1162 collects information about volumes that are used by the application 1161. This information can be collected from a settings file (in the case of a file system of Linux, for example, "/etc/fstab" file) or the like of the application 1161.

The data I/F 1110 is an interface to the data network 1300. The application 1161 and the backup agent 1162 exchange data and control commands with the storage system 1000 via the data I/F 1110. The management I/F 1150 is an interface to the management network 1400. The backup agent 1162 exchanges data and control commands with the management computer 1200 and the storage system 1000 via the management I/F 1150.

The management computer 1200 includes an input device 1240 such as a keyboard and a mouse, a CPU 1230, a display device 1220 such as a CRT, a memory 1250, and a management I/F 1210.

The CPU 1230 executes programs stored in the memory 1250. The memory 1250 stores the setting program 1251, a backup instruction program 1252, parity group information 1253, logical volume configuration information 1254, application information 1255, backup policy information 1256, copy pair information 1257, and setting program information 1258.

The setting program 1251 is a program that sets and manages a backup environment in the computer system of the first embodiment. The user enters settings information concerning data backup through a user interface provided by the setting program 1251. The setting program 1251 sets the entered settings information to relevant information in the memory, and also sends the entered settings information to the control program 1028 of the storage system 1000 over the management network 1400. The control program 1028 of the storage system 1000 stores the sent information in the main memory 1026 as the entirety or part of the management information group 1029. The processing executed by the setting program 1251 and the user interface provided by the setting program 1251 which are mentioned above will be described later with reference to FIGS. 8 and 9.

The setting program 1251 regularly obtains information about the differential amount (amount of data to be copied in differential copy) of each copy pair from the storage system 1000. Based on the obtained information and the backup policy information 1256, the setting program 1251 judges whether or not differential copy is finished within an acceptable differential copy processing time specified by the user. In the case where differential copy is not going to be finished within the acceptable differential copy processing time, the setting program 1251 makes the secondary volume of the copy pair where differential copy overruns the time limit migrate to another appropriate parity group. The migration processing will be described later with reference to FIG. 13.

The backup instruction program 1252 conducts backup operation by having the setting program 1251 instruct the backup agent 1162 of the host computer 1100 to take a backup in accordance with information set in the backup policy information 1256. Processing executed by the backup instruction program 1252 is obvious to those in the technical field of this invention and does not relate to the essence of this invention. A concrete description on the processing will therefore be omitted.

The management I/F 1210 is an interface to the management network 1400. The setting program 1251 and the backup instruction program 1252 exchange data and control commands with the host computer 1100 and the storage system 1000 via the management I/F 1210.

The parity group information 1253, the logical volume configuration information 1254, the application information 1255, the backup policy information 1256, the copy pair information 1257, and the setting program information 1258 will be described later with reference to FIGS. 2 to 7.

FIG. 2 is an explanatory diagram showing an example of the parity group information 1253 according to the first embodiment of this invention.

The parity group information 1253 contains fields for a storage ID 2001, a parity group ID 2002, a differential reception rate 2003, and a use 2004.

The storage ID 2001 is an identifier unique to each storage system throughout the computer system of the first embodiment. The parity group ID 2002 is an identifier unique to each parity group within a storage system that is identified by the storage ID 2001. The rest of the fields are for information about a parity group that is identified by the storage ID 2001 and the parity group ID 2002 uniquely throughout this computer system.

The differential reception rate 2003 indicates the amount of data that the parity group can receive per unit time through differential copy of data to the parity group. In the case where the differential reception rate 2003 depends on the rate of writing data in logical volumes of the parity group, the mean value of the rate of writing data in logical volumes of the parity group may be registered as the differential reception rate 2003. The use 2004 indicates the use of a logical volume created by partitioning the parity group and, specifically, is one of "mixed" and "exclusively secondary VOL". "Mixed" means that a logical volume created by partitioning the parity group is used as the secondary volume of a copy pair and for other uses (for example, as primary volume) as well. "Exclusively secondary VOL" means that a logical volume created by partitioning the parity group is used only as the secondary volume of a copy pair.

The storage ID 2001, the parity group ID 2002, and the differential reception rate 2003 are set by the setting program 1251 of the management computer 1200 by obtaining configuration information that is stored in the management information group 1029 from the control program 1028 of the storage system 1000. To obtain/send the configuration information, the setting program 1251 and the control program 1028 perform communication processing over the management network 1400. The communication processing is does not relate to the essence of this invention, and therefore will not be described here. Similarly, a description on communication processing will be omitted in the following description. The use 2004 is set by the user through a user interface provided by the setting program 1251.

FIG. 3 is an explanatory diagram showing an example of the logical volume configuration information 1254 according to the first embodiment of this invention.

The logical volume configuration information 1254 contains fields for a storage ID 3001, a logical VOL 3002, a parity group 3003, a capacity 3004, and an allocation 3005.

The storage ID 3001 is an identifier unique to each storage system throughout the computer system of the first embodiment. The logical VOL 3002 indicates an identifier unique to each logical volume within a storage system that is identified by the storage ID 3001. The rest of the fields are for information about a logical volume that is identified by the storage ID 3001 and the logical VOL 3002 uniquely throughout the computer system of the first embodiment. The parity group 3003 indicates the identifier of a parity group to which the logical volume belongs. The capacity 3004 is the capacity of the logical volume. The allocation 3005 indicates the utilization situation of the logical volume. Specifically, "unused", "secondary VOL", "primary VOL", and the like are registered as the allocation 3005. "Unused" means that the logical volume is one that is not in use. "Secondary VOL" means that the logical volume is one that is being used as the secondary volume of a copy pair. "Primary VOL" means that the logical volume is one that is being used as the primary volume of a copy pair.

The respective fields of the logical volume configuration information 1254 are set by the setting program 1251 of the management computer 1200 by obtaining configuration information that is stored in the management information group 1029 from the control program 1028 of the storage system 1000. The allocation 3005 is updated through the processing executed by the setting program 1251 which will be described later.

Figure 4:
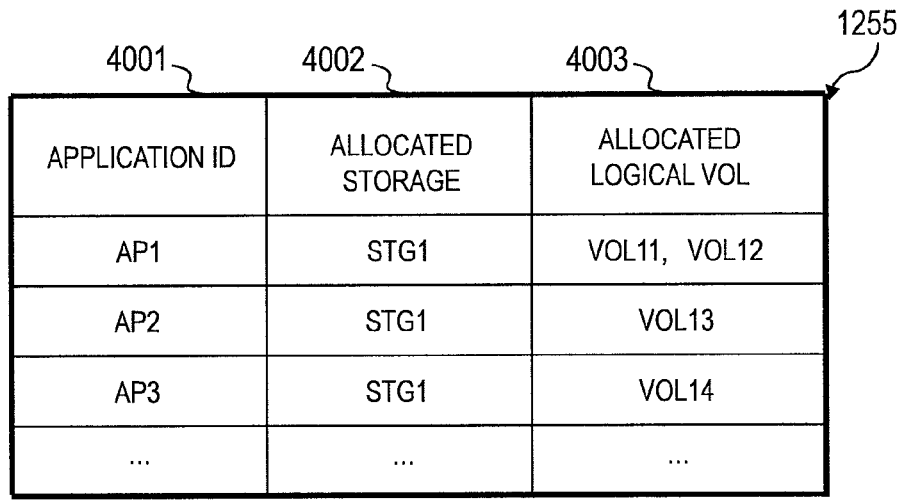
FIG. 4 is an explanatory diagram showing an example of the application information in accordance with the first embodiment of this invention.

FIG. 4 is an explanatory diagram showing an example of the application information 1255 according to the first embodiment of this invention.

The application information 1255 contains fields for an application ID 4001, allocated storage 4002, and an allocated logical volume 4003.

The application ID 4001 is an identifier unique to each application program throughout the computer system of the first embodiment. The rest of the fields are for information about an application program that is identified by the application ID 4001. The allocated storage 4002 indicates the identifier of a storage system to which a logical volume that is used by the application program belongs. The allocated logical volume 4003 indicates the identifier of a logical volume that is used by the application program. A cell in the field for the allocated logical volume 4003 may hold the identifiers of a plurality of logical volumes which are separated by "," (comma).

The respective fields of the application information 1255 are set by the setting program 1251 by obtaining information about a volume that is used by the application 1161 from the backup agent 1162 of the host computer 1100.

Figure 5:
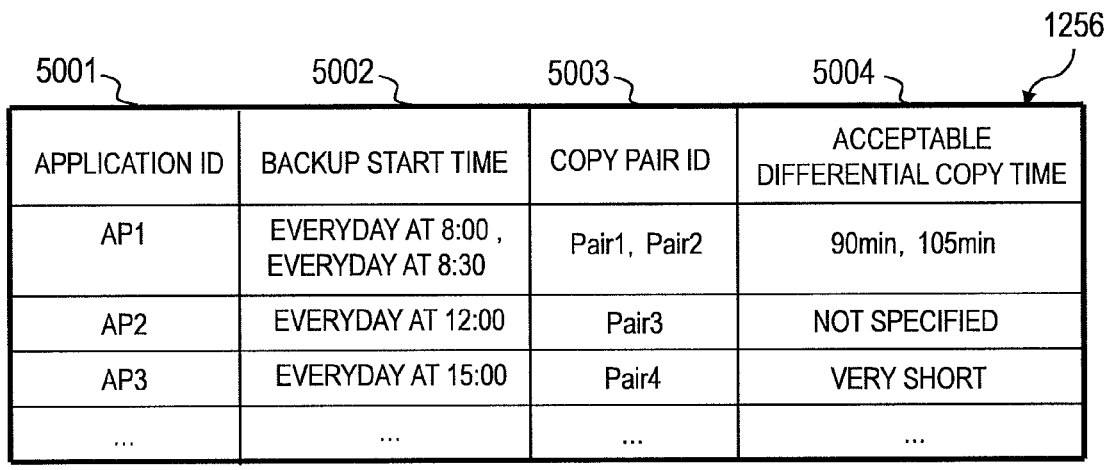
FIG. 5 is an explanatory diagram showing an example of the backup policy information in accordance with the first embodiment of this invention.

FIG. 5 is an explanatory diagram showing an example of the backup policy information 1256 according to the first embodiment of this invention.

The backup policy information 1256 contains fields for an application ID 5001, a backup start time 5002, a copy pair ID 5003, and an acceptable differential copy time 5004.

The application ID 5001 is an identifier unique to each application program throughout the computer system of the first embodiment. The backup start time 5002 indicates a time at which data backup is started for an application program that is identified by the application ID 5001 (for example, "everyday at 8:00"). The copy pair ID 5003 is the identifier of a copy pair where data backup is started at a time indicated by the backup start time 5002. A cell in the field for the copy pair ID 5003 may hold a plurality of identifiers separated by "," (comma).

The acceptable differential copy time 5004 is a length of time that is acceptable as the differential copy processing time in data backup (acceptable differential copy time). Specifically, "very short", "not specified", or "specified" time (e.g., 10 min.) is written as the acceptable differential copy time 5004. "Very short" means that the differential copy time is made as short as possible. "not specified" means that how long differential copy takes does not matter. "Specified time" means that differential copy should be finished within a specified period of time since the start of the differential copy.

The respective elements of the backup policy information 1256 are set by the user through a user interface provided by the setting program 1251. The user interface and the processing executed by the setting program 1251 will be described later with reference to FIGS. 8 to 11.

FIG. 6 is an explanatory diagram showing an example of the copy pair information 1257 according to the first embodiment of this invention.

The copy pair information 1257 contains fields for a copy pair ID 6001, primary VOL storage 6002, a primary VOL 6003, secondary VOL storage 6004, and a secondary VOL 6005.

The copy pair ID 6001 is an identifier unique to each copy pair throughout the computer system of the first embodiment. The rest of the fields are for information about a copy pair that is identified by the copy pair ID 6001. The primary VOL storage 6002 indicates the identifier of a storage system to which the primary volume of the copy pair belongs. The primary VOL 6003 indicates the identifier of the primary volume of the copy pair. The secondary VOL storage 6004 indicates the identifier of a storage system to which the secondary volume of the copy pair belongs. The secondary VOL 6005 indicates the identifier of the secondary volume of the copy pair.

The respective fields of the copy pair information 1257 are set as follows: In the case of an existing copy pair, the setting program 1251 sets information obtained from the control program 1028. In the case of a new copy pair, the user sets information on the new copy pair through a user interface provided by the setting program 1251 when setting the new copy pair. The user interface and processing of the setting program 1251 that are for setting a new copy pair will be described later with reference to FIGS. 8 to 11.

FIG. 7 is an explanatory diagram showing an example of the setting program information 1258 according to the first embodiment of this invention.

The setting program information 1258 contains fields for a differential copy processing time maintaining processing cycle 7001 and a simulation time 7002.

Figure 13:
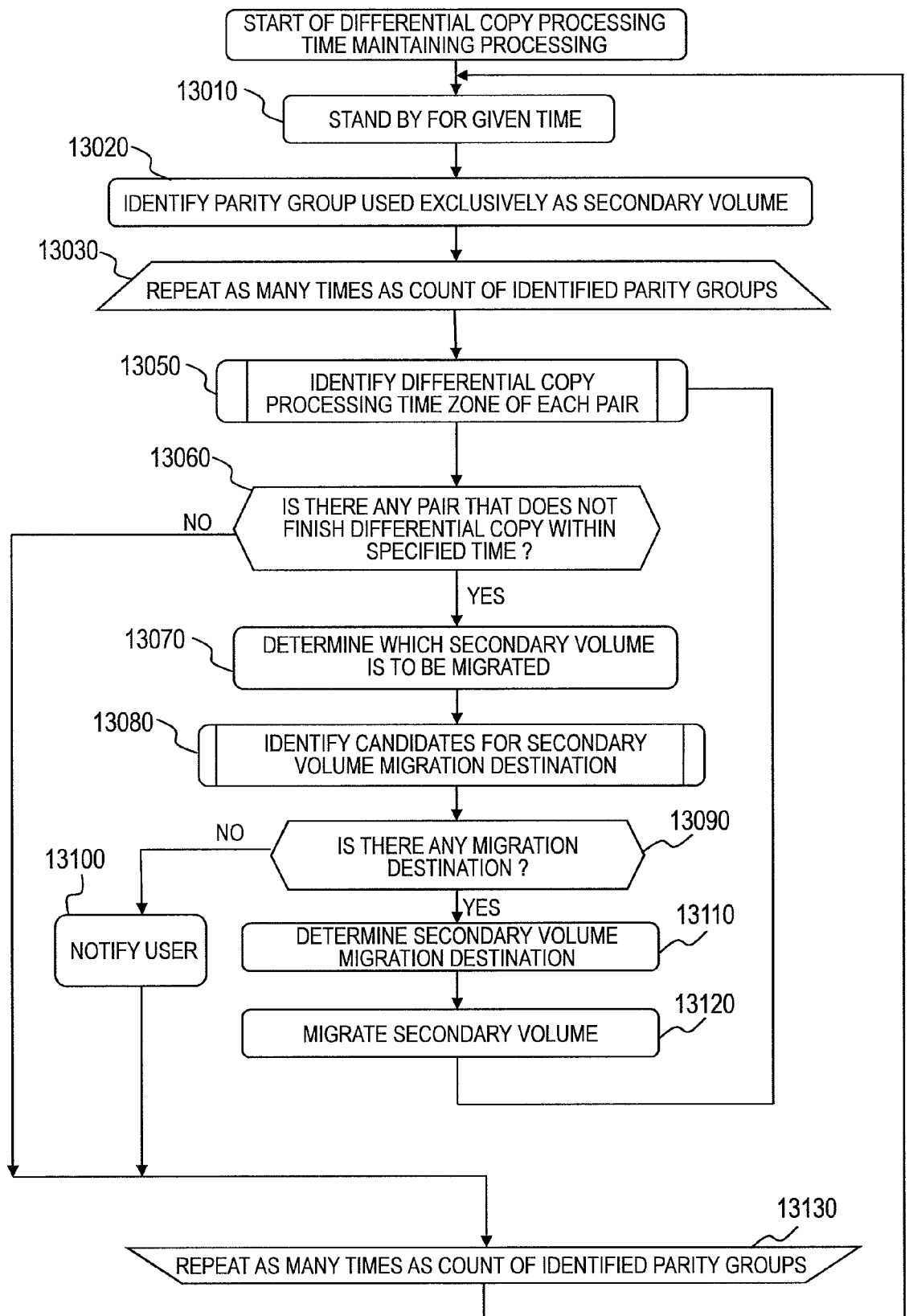
FIG. 13 is a flow chart showing processing of managing copy pairs such that differential copy is finished within an acceptable differential copy time in accordance with the first embodiment of this invention.

The differential copy processing time maintaining processing cycle 7001 indicates a cycle in which the setting program 1251 executes backup time maintaining processing. The differential copy processing time maintaining processing cycle, which will be described later with reference to FIG. 13, is a cycle employed by the setting program 1251 to regularly monitor each copy pair for whether or not the copy pair finishes differential copy within an acceptable differential copy time determined in advance. For example, when the differential copy processing time maintaining processing cycle 7001 is set to "5 min.", the setting program 1251 monitors for every five minutes for whether or not differential copy has been finished within an acceptable differential copy time specified by the user.

The simulation time 7002 is a time frame for a simulation of the differential copy processing time which is performed by the setting program 1251. For example, when the simulation time 7002 is set to "seven days", the setting program 1251 performs a simulation for a time frame spanning seven full days from the current time. The respective elements of the setting program information 1258 are set by the user through a user interface provided by the setting program 1251.

Figure 8:
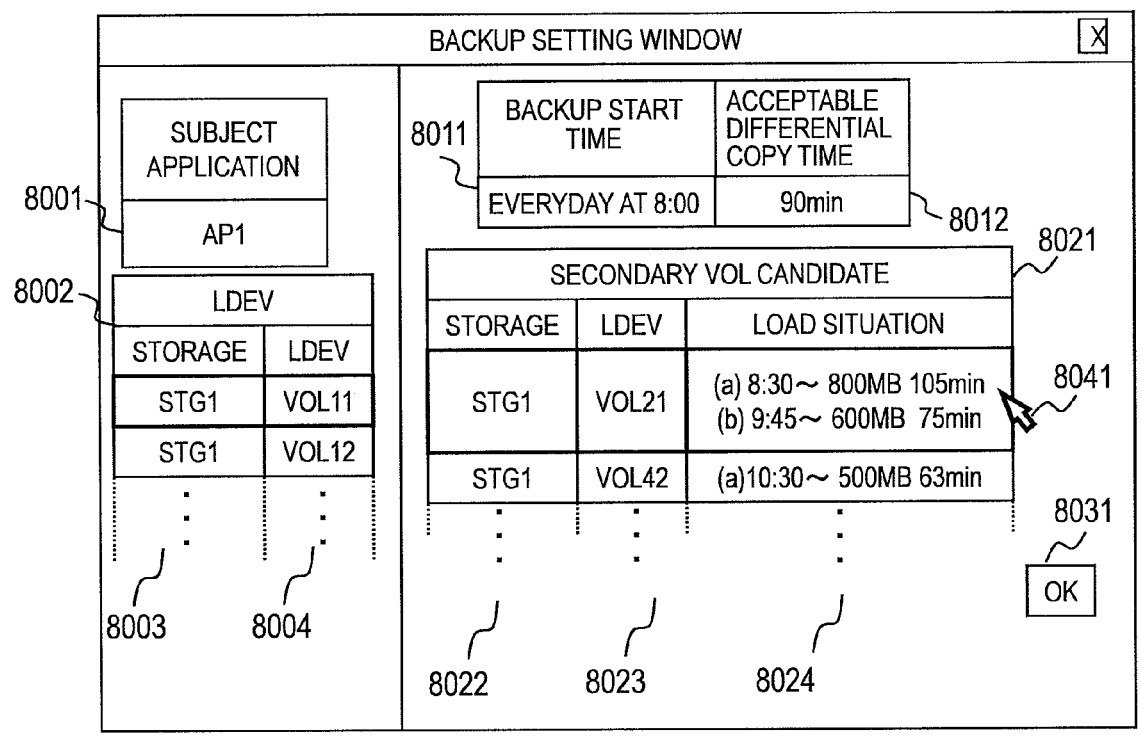
FIG. 8 is an explanatory diagram showing an example of a window for setting a backup environment in accordance with the first embodiment of this invention.

FIG. 8 is an explanatory diagram showing an example of a window for setting a backup environment according to the first embodiment of this invention.

A text field 8001 is a text field in which the user enters the ID of an application program for which backup settings are set (subject application program). A list 8002 lists up logical volumes (primary volumes to choose from) that are used by an application program entered in the text field 8001. The list 8002 has column fields for storage 8003 and an LDEV 8004. The column field for the storage 8003 displays the identifier of a storage system to which a logical volume used by the subject application program belongs.

The column field for the LDEV 8004 displays the identifier of a logical volume used by the subject application program. A record entry of the list 8002 is displayed when an appropriate value is entered in the text field 8001. When selected with a mouse pointer, a record entry of the list 8002 is highlighted and the logical volume of this record entry is treated as the primary volume of a copy pair.

A text field 8011 is a text field in which the user enters a time at which data backup is to be started. For example, "everyday at 8:00" or "every Monday at 8:00" is entered in the text field 8011. A text field 8012 is a text field in which the user enters an acceptable differential copy time. Entered in the text field 8012 is "very short", "not specified", or an actual "specified time". The actual "specified time" is, for example, "10 min." which indicates ten minutes.

A list 8021 lists up candidates for the secondary volume to be paired with a primary volume that is selected from the list 8002. The list 8021 has column fields for storage 8022, an LDEV 8023, and a load situation 8024. The storage 8022 indicates the identifier of a storage system to which a logical volume that is a candidate for the secondary volume belongs. The LDEV 8023 indicates the identifier of a logical volume that is a candidate for the secondary volume. The load situation 8024 indicates a time zone in which the load of differential copy is applied to a parity group to which a logical volume that is a candidate for the secondary volume belongs. Specifically, a differential copy start time, a differential amount (amount of data to be copied in differential copy), and a processing time are displayed as the load situation 8024.

In the case where the load applies during more than one time zone, a plurality of time zones are listed as the load situation 8024. A record entry of the list 8021 is displayed when a primary volume is selected from the list 8002 and appropriate values are entered in the text field 8011 and the text field 8012. When selected with a mouse pointer, a record entry of the list 8021 is highlighted and a logical volume identified by the storage 8022 and LDEV 8023 of the record entry is treated as the secondary volume of a copy pair.

An OK button 8031 is a button for instructing the setting program 1251 to create a copy pair that has as the primary volume a logical volume selected from the list 8002 and as the secondary volume a logical volume selected from the list 8021. A mouse pointer 8041 is operated by the user.

Processing executed by the setting program 1251 will be described next with reference to FIGS. 9 to 13.

Figure 9:
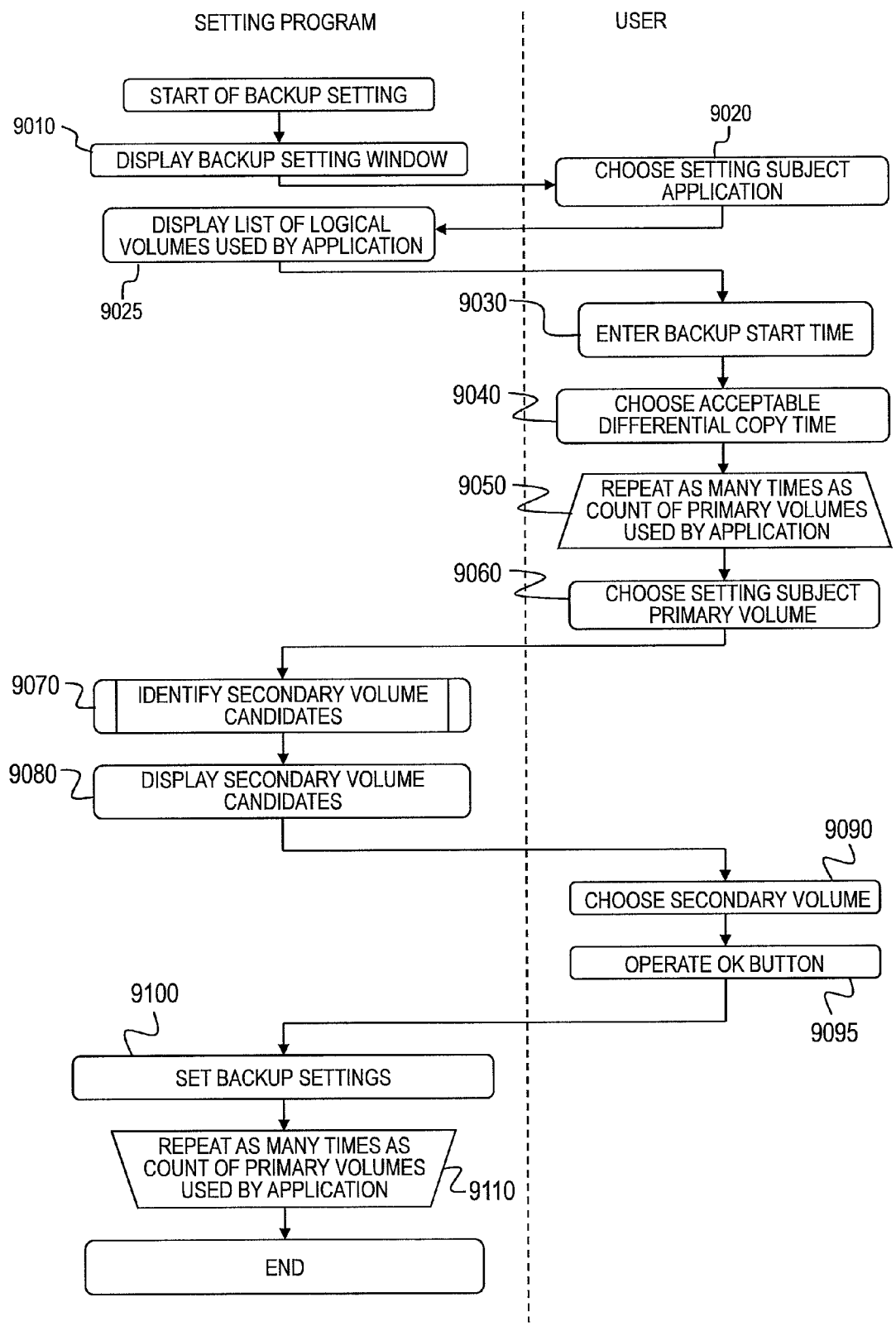
FIG. 9 is a flow chart showing processing of setting a backup environment in accordance with the first embodiment of this invention.

FIG. 9 is a flow chart showing processing of setting a backup environment according to the first embodiment of this invention.

When activated, the setting program 1251 first displays the backup setting window shown in FIG. 8 (Step 9010). Next, the user enters the application ID of an application program for which backup settings are set (subject application program) in the text field 8001 of the backup setting window (Step 9020). The setting program 1251 obtains from the application information 1255 logical volumes that are used by the application program identified by the entered application ID, and displays the logical volumes in the list 8002 of the backup setting window (Step 9025).

The user next enters a backup start time in the text field 8011 of the backup setting window (Step 9030). The user also enters an acceptable differential copy time in the text field 8012 of the backup setting window (Step 9040).

Next, Steps 9060 to 9100 are repeated as many times as the count of logical volumes listed up in the list 8002 of the backup setting window (Step 9050). The user first selects a logical volume that is to serve as the primary volume of a copy pair from the list 8002 of the backup setting window (Step 9060). Based on the selection, the setting program 1251 identifies candidates for the secondary volume (Step 9070). Step 9070 will be described later with reference to FIG. 10.

The setting program 1251 displays the identified secondary volume candidates in the list 8021 of the backup setting window (Step 9080). From the displayed secondary volume candidates, the user selects a logical volume that is to serve as the secondary volume of the copy pair (Step 9090), and operates the OK button 8031 of the backup setting window (Step 9095). The setting program 1251 reacts to the OK button 8031 being operated, by setting the backup environment (Step 9100).

Specifically, the setting program 1251 refers to the copy pair information 1257 to create an unused copy pair ID, and associates the created copy pair ID with information of the pair consisting of the selected primary volume and secondary volume. The setting program 1251 registers every copy pair ID newly created in this manner in the copy pair information 1257. The setting program 1251 next registers the backup start time and acceptable differential copy time entered by the user and the newly created copy pair ID in the backup policy information 1256 in association with the specified application ID. The setting program 1251 then updates an entry of the logical volume configuration information 1254 for the logical volume selected as the secondary volume. Lastly, the setting program 1251 instructs the control program 1028 to create the copy pair of the primary volume and the secondary volume that is associated with the created copy pair ID.

After Steps 9060 to 9100 are repeated as many times as the count of logical volumes listed up in the list 8002 of the backup setting window, the setting program 1251 ends the processing. The above is the processing that is executed by the setting program 1251 when the user sets a backup environment.

Figure 10:
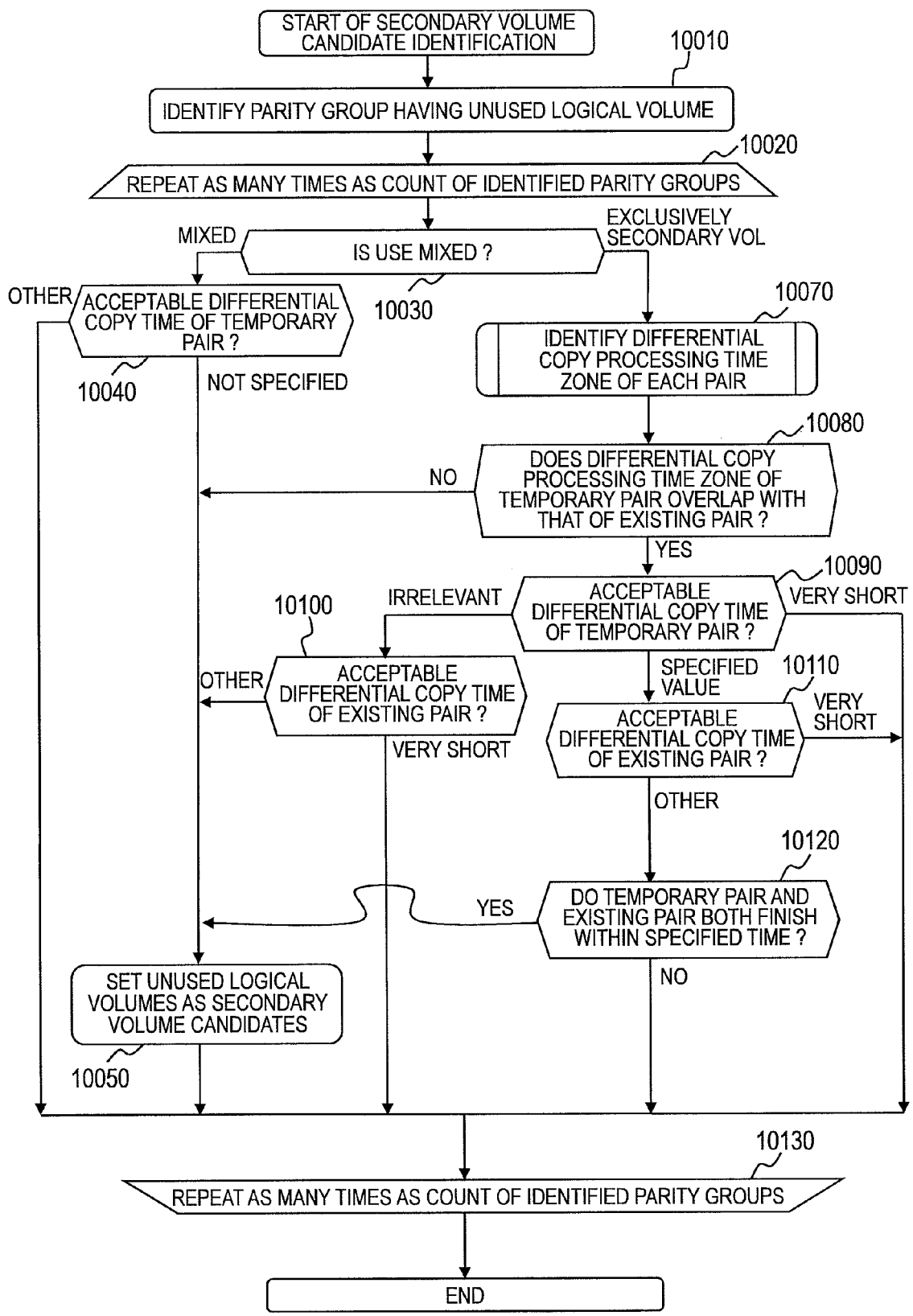
FIG. 10 is a flow chart showing processing of presenting candidates for the secondary volume of a copy pair in accordance with the first embodiment of this invention.

Described next with reference to FIG. 10 is Step 9070 of FIG. 9, namely, processing of searching for candidates for the secondary volume.

FIG. 10 is a flow chart showing processing of presenting candidates for the secondary volume of a copy pair according to the first embodiment of this invention.

The setting program 1251 first searches the logical volume configuration information 1254 for unused logical volumes and identifies parity groups of the logical volumes (Step 10010).

Subsequently, Steps 10020 to 10130 are repeated as many times as the count of the identified parity groups (Step 10020). The setting program 1251 next refers to the parity group information 1253 to check the use of the parity group that is being processed (Step 10030).

When the use of the parity group is found in Step 10030 to be "mixed", the setting program 1251 checks the acceptable differential copy time entered in the text field 8012 (Step 10040).

When the entered acceptable differential copy time is found in Step 10040 to be "not specified", the setting program 1251 sets, as candidates for the secondary volume, unused logical volumes that belong to this parity group and that fit the attributes (e.g., value of the capacity 3004 in the logical volume configuration information 1254) of the selected primary volume (Step 10050). The setting program 1251 then proceeds to identifying secondary volume candidates of the next parity group (Step 10130).

When the entered acceptable differential copy time is found in Step 10040 to be other than "not specified", namely, "very short" or "specified time", the setting program 1251 judges that this parity group contains no unused logical volume that can be a candidate for the secondary volume, and proceeds to identifying secondary volume candidates of the next parity group (Step 10130).

When the use of the parity group is found in Step 10030 to be "exclusively secondary VOL", the setting program 1251 temporarily determines an unused logical volume in this parity group as the secondary volume, thereby creating a new copy pair, and calculates a differential copy processing time zone of each copy pair (new copy pair and existing copy pairs) belonging to this parity group (Step 10070). In the following description, when a new copy pair is created by temporarily determining as the secondary volume a logical volume in a parity group that is being processed, the new copy pair is referred to as "temporary copy pair". Step 10070 will be described later with reference to FIG. 11.

The setting program 1251 next checks whether or not the differential copy processing time zone of any existing pair and the differential copy processing time zone of the temporary copy pair overlap each other (Step 10080).

When it is found in Step 10080 that the differential copy processing time zones do not overlap each other, the setting program 1251 moves to Step 10050, where the unused logical volume that has temporarily been determined as the secondary volume is set as a secondary volume candidate (Step 10050).

When it is found in Step 10080 that the differential copy processing time zones overlap each other, the setting program 1251 checks the acceptable differential copy time of the temporary copy pair which has temporarily been created (Step 10090).

When the acceptable differential copy time of the temporary copy pair is found in Step 10090 to be "not specified", the setting program 1251 checks the acceptable differential copy time of the existing copy pair whose differential copy processing time zone overlaps the differential copy processing time zone of the existing copy pair (Step 10100).

When the acceptable differential copy time of the existing copy pair is found in Step 10100 to be "very short", the setting program 1251 judges that this parity group contains no unused logical volume that can be a candidate for the secondary volume, and proceeds to identifying secondary volume candidates of the next parity group (Step 10130).

On the other hand, when the acceptable differential copy time of the existing copy pair is found in Step 10100 to be other than "very short", namely, "specified time" or "not specified", the setting program 1251 moves to Step 10050, where the unused logical volume that has temporarily been determined as the secondary volume is set as a secondary volume candidate.

When the acceptable differential copy time of the existing copy pair is found in Step 10090 to be "very short", the setting program 1251 judges that this parity group contains no unused logical volume that can be a candidate for the secondary volume, and proceeds to identifying secondary volume candidates of the next parity group (Step 10130).

When the acceptable differential copy time of the existing copy pair is found in Step 10090 to be "specified time", the setting program 1251 checks the acceptable differential copy time of the existing copy pair whose differential copy processing time zone overlaps the differential copy processing time zone of the existing copy pair (Step 10110).

When the acceptable differential copy time of the existing copy pair is found in Step 10110 to be "very short", the setting program 1251 judges that this parity group contains no unused logical volume that can be a candidate for the secondary volume, and proceeds to identifying secondary volume candidates of the next parity group (Step 10130).

When the acceptable differential copy time of the existing copy pair is found in Step 10110 to be other than "very short", namely, "specified time" or "not specified", the setting program 1251 checks whether or not the temporary copy pair and the existing copy pair both finish differential copy processing within their respective specified acceptable differential copy times based on the results of Step 10070 (Step 10120).

When it is found in Step 10120 that the temporary and existing copy pairs are going to finish differential copy processing within the acceptable differential copy times, the setting program 1251 moves to Step 10050, where the unused logical volume that has temporarily been determined as the secondary volume is set as a secondary volume candidate.

When it is found in Step 10120 that the temporary and existing copy pairs are not going to finish differential copy processing within the acceptable differential copy times, the setting program 1251 judges that this parity group contains no unused logical volume that can be a candidate for the secondary volume, and stops processing this parity group to proceed to identifying secondary volume candidates of the next parity group (Step 10130).

Step 9070 is ended when every parity group finishes the above-mentioned processing. The above are specifics of the processing of FIG. 10 (Step 9070 of FIG. 9).

Step 10070 of FIG. 10 will be described next with reference to FIG. 11.

Figure 11:
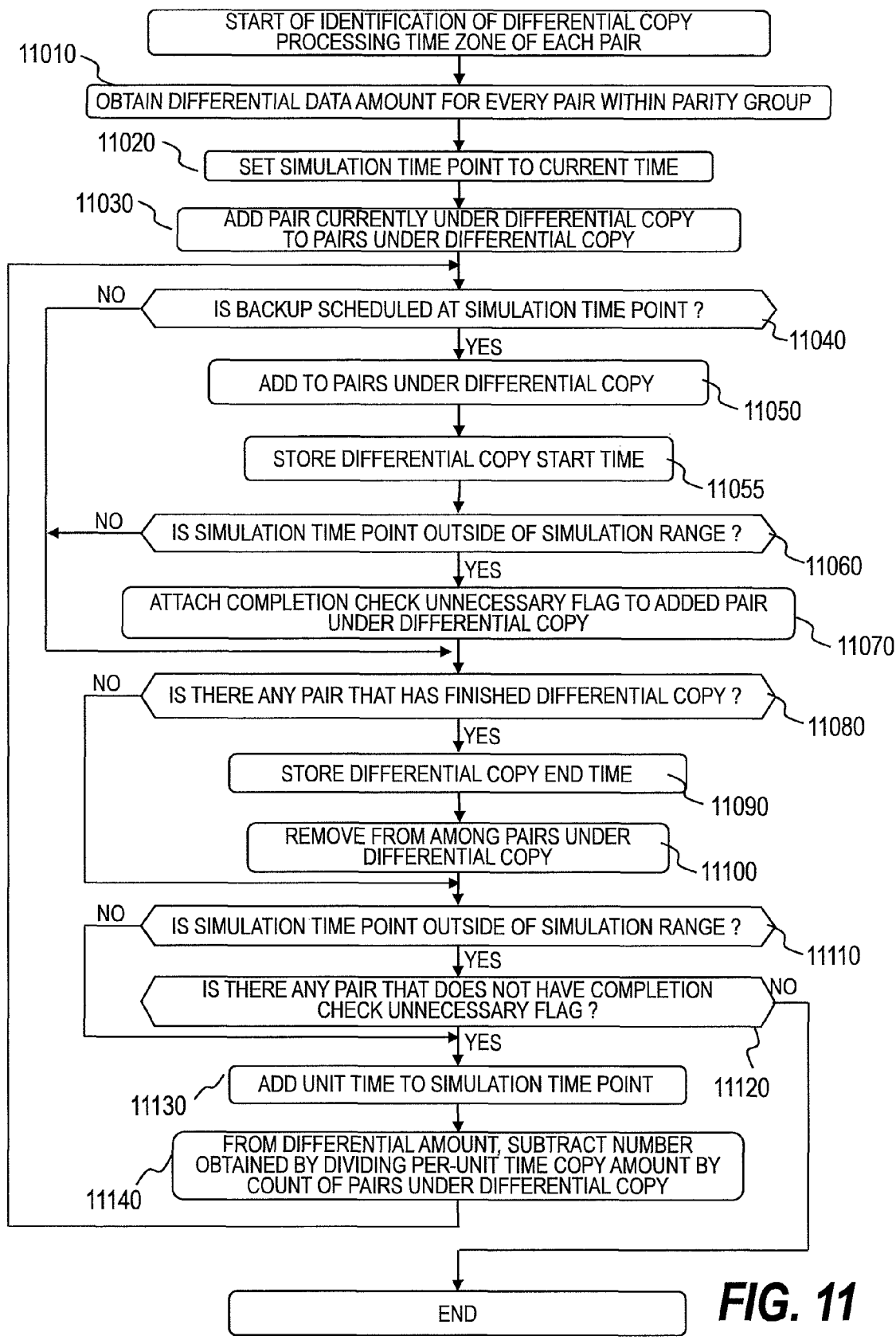
FIG. 11 is a flow chart showing processing of calculating the differential copy processing time of each copy pair in a parity group in accordance with the first embodiment of this invention.

FIG. 11 is a flow chart showing processing of calculating the differential copy processing time of each copy pair in a parity group according to the first embodiment of this invention.

The setting program 1251 first uses the logical volume configuration information 1254 and the copy pair information 1257 to identify every copy pair belonging to the parity group that is being processed, obtains the differential data amount of each identified copy pair from the control program 1028 of the storage system 1000, and stores the obtained differential data amount as attribute information of each copy pair (Step 11010). In the case where the identified copy pairs include a copy pair where differential copy is being executed, the amount of differential data that has not been copied yet is obtained and stored as the attribute information.

The setting program 1251 subsequently simulates differential copy. First, the setting program 1251 stores the current time as a time point used in the simulation (Step 11020). A time point to be used in the simulation is referred to as "simulation time point" here. The time point set as the simulation time point is moved ahead by a given unit time in Step 11130, which will be described later, each time a series of processing of Steps 11040 to 11120 is finished.

Next, in the case where the identified copy pairs include a copy pair where differential copy is actually being executed, the setting program 1251 stores this copy pair as a "copy pair under differential copy" (Step 11030).

The setting program 1251 next refers to the backup start time 5002 of the backup policy information 1256 to check whether or not data backup is scheduled to start at the time set as the simulation time point (Step 11040). In the case where Step 11040 is executed in the backup setting processing shown in FIG. 9 or other similar processing, the setting program 1251 also checks whether or not a backup operation newly set by values that are entered in the text field 8011 and other fields shown in FIG. 8 is started at the simulation time point.

When it is found in Step 11040 that data backup is not scheduled to start at the simulation time point, the setting program 1251 proceeds to Step 11080.

When it is found in Step 11040 that data backup is scheduled to start at the simulation time point, the setting program 1251 adds a copy pair where differential copy is executed for this scheduled backup to the copy-pair-under-differential-copy category (Step 11050). In the case where Step 11040 is executed in the backup setting processing of FIG. 9, the setting program 1251 adds a new copy pair created by temporarily determining a logical volume in the parity group as the secondary volume to the copy-pair-under-differential-copy category as a "temporary copy pair", which has been described with reference to FIG. 10.

The setting program 1251 then stores the simulation time point as a differential copy start time of this copy pair (Step 11055).

The setting program 1251 next judges whether or not the simulation time point is outside a simulation range (Step 11060). The simulation range spans a length of time set as the simulation time 7002 of FIG. 7 (for example, seven days (168 hours)) from the "current time" set in Step 11020.

When it is found in Step 11060 that the simulation time point is outside the simulation range, in other words, when the copy pair added in Step 11050 to the copy-pair-under-differential-copy category starts differential copy later than the set simulation end time, the setting program 1251 attaches to this copy pair attribute information that indicates that differential copy completion check is unnecessary (Step 11070), and proceeds to Step 11080. The attribute information is referred to as "completion check unnecessary flag" here.

A copy pair to which the completion check unnecessary flag is attached starts differential copy later than the simulation end time, but is included as a simulation subject until other copy pairs where differential copy is started before the set simulation end time and continues past the simulation end time finish executing differential copy (the copy pair does not need differential copy completion check, through).

This is because the overlapping of the differential copy time zone of the copy pair with the completion check unnecessary flag and the differential copy time zones of the other copy pairs causes the differential reception rate of the parity group to be distributed, and could affect differential copy processing of the other copy pairs.

When it is found in Step 11060 that the simulation time point is within the simulation range, the setting program 1251 proceeds to Step 11080.

Next, the setting program 1251 checks whether or not copy pairs in the copy-pair-under-differential-copy category include one that finishes differential copy at the simulation time point (Step 11080).

Whether differential copy is finished or not is judged differently for existing copy pairs and temporary copy pairs.

For existing copy pairs, the setting program 1251 judges that differential copy has been finished when the differential data amount (amount of differential data yet to be copied) stored as the attribute information is 0 or less.

For temporary copy pairs, the setting program 1251 judges based on the acceptable differential copy time entered through the backup setting window of FIG. 8 or other measures. The setting program 1251 deemes that a temporary copy pair has finished differential copy when the entered acceptable differential copy time is "very short" or "not specified". In the case where the entered acceptable differential copy time is an actual "specified time", the setting program 1251 judges that a temporary copy pair has finished differential copy when a time point set as the simulation time point is later than a time point that is obtained by adding the "specified time" to the differential copy start time of this copy pair. The judgment is made on the assumption that the entire acceptable differential copy time indicated by the "specified time" is spent in executing differential copy.

When it is found in Step 11080 that no copy pair finishes differential copy at the simulation time point, the setting program 1251 proceeds to Step 11110. When it is found in Step 11080 that at least one copy pair finishes differential copy at the simulation time point, the setting program 1251 stores the set simulation time point as a differential copy end time of this copy pair (Step 11090). The setting program 1251 then removes this copy pair from the copy-pair-under-differential-copy category (Step 11100) and proceeds to Step 11110.

The setting program 1251 next judges, as in Step 11060, whether or not the simulation time point is outside the simulation range (Step 11110).

When it is judged in Step 11110 that the simulation time point is within the simulation range, the setting program 1251 proceeds to Step 11130. When it is judged in Step 11110 that the simulation time point is outside the simulation range, the setting program 1251 checks whether or not copy pairs in the copy-pair-under-differential-copy category include a copy pair to which the completion check unnecessary flag is not attached (Step 11120).

When it is found in Step 11120 that copy pairs in the copy-pair-under-differential-copy category include a copy pair without the completion check unnecessary flag, the setting program 1251 adds the unit time to the simulation time point (Step 11130). It is judged that copy pairs in the copy-pair-under-differential-copy category include a copy pair without the completion check unnecessary flag when there is a copy pair that starts differential copy earlier than the set simulation end time and finishes differential copy later than the simulation end time and that needs to be checked for the completion of differential copy.

The unit time by which the simulation time point is moved ahead is one minute in the first embodiment, but may be set to other numerical values.

The setting program 1251 next calculates from the differential reception rate 2003 of the parity group information 1253 the amount of differential data that the parity group being processed can receive per unit time. The calculated per-unit time differential data amount is divided by the count of copy pairs stored in the copy-pair-under-differential-copy category, and the quotient is subtracted from the differential data amount that is stored as the attributes of each copy pair (Step 11140). However, the subtraction is not performed for temporary copy pairs. The setting program 1251 then returns to Step 11040.

When it is found in Step 11120 that copy pairs in the copy-pair-under-differential-copy category do not include a copy pair without the completion check unnecessary flag, in other words, when every copy pair that has started differential copy earlier than the set simulation end time has finished differential copy, the setting program 1251 ends the processing.

The above is the processing of FIG. 11 (Step 10070 of FIG. 10). Through this processing, a time zone in which differential copy takes place can be calculated for each copy pair.

While the calculation in Step 11080 assumes that the differential copy processing time is minimum for a temporary copy pair whose acceptable differential copy time is "not specified" in the above-mentioned description, a maximum differential copy processing time may be assumed instead. In other words, it may always be judged that the temporary copy pair has not finished differential copy. In this case, however, the setting program 1251 needs to attach the completion check unnecessary flag to this temporary copy pair.

In Step 111010, the setting program 1251 obtains the differential data amount of each copy pair from the control program 1028. Alternatively, the actual differential data amount observed in executing differential copy may be stored several times for each copy pair during backup operation, and hence the mean value of the stored values may be used as the differential data amount.

In Step 11140, the amount of differential data that can be copied per unit time to a parity group is equally divided among copy pairs of the parity group. Alternatively, a priority level may be set to each copy pair, whereby the amount of differential data copied per unit time is distributed in order of priority.

Next, a concrete description will be given with reference to FIGS. 12A to 12D to outline the processing of the setting program 1251 shown in FIG. 11.

Figures 12A, 12B:
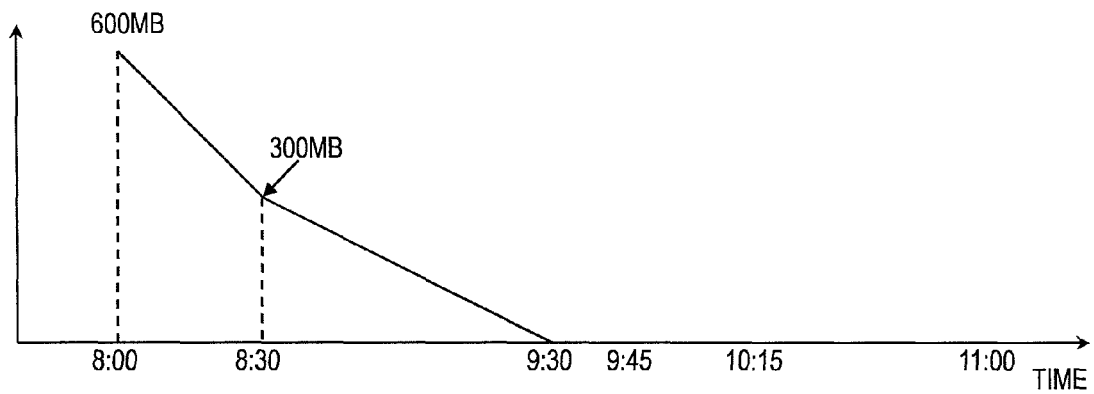
FIG. 12A is an explanatory diagram showing a differential copy state of a copy pair in accordance with the first embodiment of this invention.
FIG. 12B is an explanatory diagram showing a transition in differential data amount of the copy pair 1 in accordance with the first embodiment of this invention.
Figure 12C:
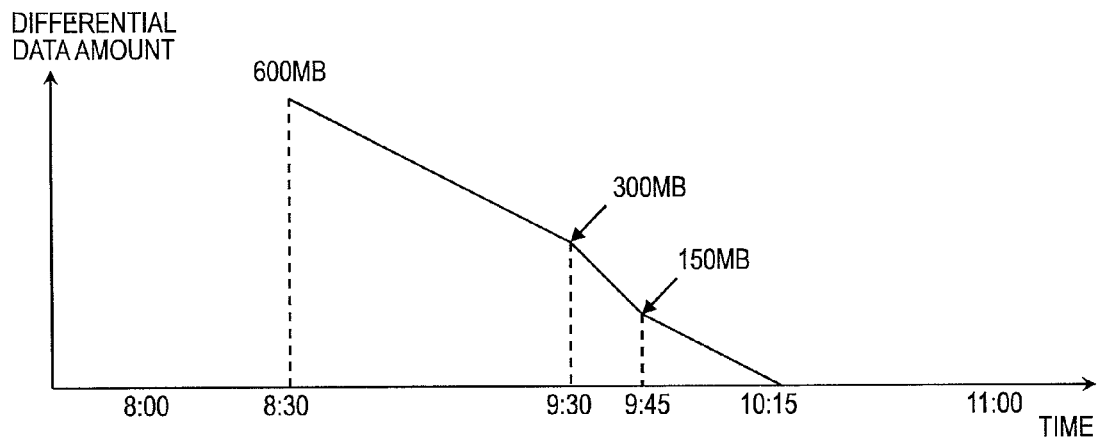
FIG. 12C is an explanatory diagram showing a transition in differential data amount of the copy pair 2 in accordance with the first embodiment of this invention.
Figure 12D:
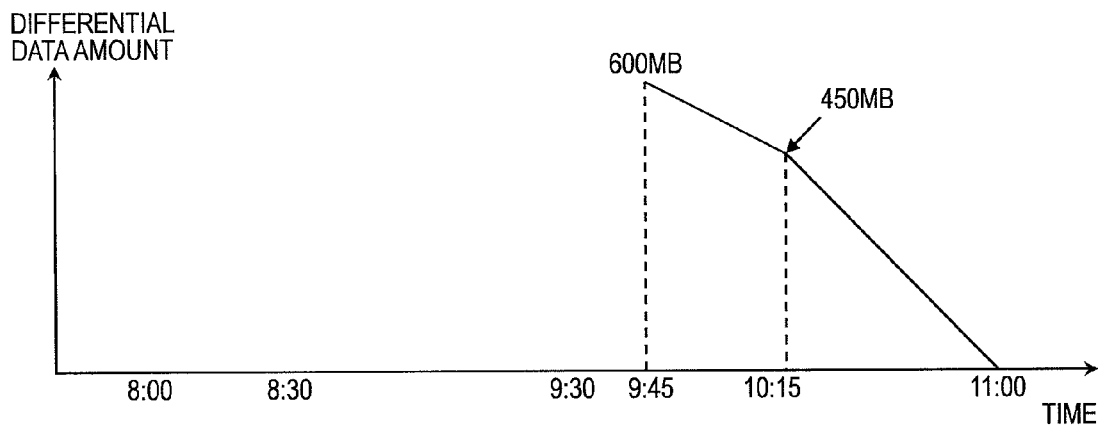
FIG. 12D is an explanatory diagram showing a transition in differential data amount of the copy pair 3 in accordance with the first embodiment of this invention.

FIGS. 12A to 12D are explanatory diagrams of differential copy processing of different copy pairs in a parity group according to the first embodiment of this invention. FIG. 12A shows differential copy information set to the respective copy pairs by the setting program 1251. FIGS. 12B to 12D show transitions with time in differential data amount of the respective copy pairs based on a simulation executed by the setting program 1251.

FIG. 12A is an explanatory diagram showing a differential copy state of a copy pair according to the first embodiment.

The setting program 1251 first identifies an existing parity group and stores its copy pairs as the copy pair ID 12000. In this example, the parity group has three copy pairs: a copy pair 1 whose backup start time is 8:00 everyday, a copy pair 2 whose backup start time is 8:30 everyday, and a copy pair 3 whose backup start time is 9:45 everyday. The setting program 1251 obtains the differential data amounts of the respective copy pairs and stores the obtained differential data amounts as the differential data amount 12020. The differential data amount in this example is 600 MB for each copy pair. In Step 11020, the setting program 1251 sets the current time as the simulation time point. The current time in this example is 7:00.

Since none of the copy pairs starts data backup until 8:00, the setting program 1251 repeats the processing of adding the unit time to the simulation time point (Step 11130) to advance the simulation time point to 8:00. When the simulation time point reaches 8:00, data backup is executed starting differential copy of the copy pair 1. The setting program 1251 sets "YES" to an under-differential-copy label 12030 in order to manage the copy pair 1 as a copy pair in the copy-pair-under-differential-copy category.

The setting program 1251 also stores the simulation time point (8:00 in this case) as a start time 12050. The setting program 1251 moves ahead the simulation time point by the unit time. The unit time in this example is one minute. The copy rate (differential reception rate) of the parity group is 10 MB/min in this example.

FIG. 12B is an explanatory diagram showing a transition in differential data amount of the copy pair 1 according to the first embodiment.

Between 8:00 and 8:30, the copy pair 1 is the only copy pair where differential copy is being executed. The setting program 1251 therefore subtracts 10 MB at a time from the differential data amount 12020 of the copy pair 1 whenever the unit time passes until the simulation time point reaches 8:30. In short, the differential data amount of the copy pair 1 decreases by 10 MB per minute between 8:00 and 8:30.

When it is 8:30, the copy pair 2 starts differential copy, which means that, between 8:30 and 9:30, there are two copy pairs where differential copy is being executed. The differential data copy rate (differential reception rate) in this time period is therefore 5 MB per minute. The setting program 1251 subtracts 5 MB at a time from the differential data amount 12020 of each copy pair whenever the unit time passes. In short, from 8:30 and on, the differential data amount of the copy pair 1 decreases by 5 MB per minute. With the simulation progressing in this manner by subtracting on a unit time basis, the differential data amount of the copy pair 1 reaches 0 MB at 9:30. This confirms that the copy pair 1 has finished differential copy, and the setting program 1251 stores the simulation time point at which the copy pair 1 has finished differential copy (here, 9:30) as an end time 12060 in the record entry for the copy pair 1 shown in FIG. 12A. The setting program 1251 also rewrites the under-differential-copy label 12030 in the record entry for the copy pair 1 with "NO" shown in FIG. 12A.

FIG. 12C is an explanatory diagram showing a transition in differential data amount of the copy pair 2 according to the first embodiment.

Between 8:30 and 9:30, there are two copy pairs where differential copy is being executed, and the differential data copy rate (differential reception rate) is accordingly 5 MB per minute. Between 9:30 and 9:45, differential copy is being executed only in one copy pair, and the setting program 1251 subtracts 10 MB at a time from the differential data amount 12020 of the copy pair 2 whenever the unit time passes. At 9:45, the copy pair 3 starts differential copy. The differential data amount of the copy pair 2 now decreases by 5 MB per minute, and the copy pair 2 finishes differential copy at 10:15.

FIG. 12D is an explanatory diagram showing a transition in differential data amount of the copy pair 3 according to the first embodiment.

Between 9:45 and 10:15, where differential copy is being executed in two copy pairs, the differential data copy rate is 5 MB per minute, and the differential data amount decreases by 5 MB per minute for the copy pair 2 and the copy pair 3 each. At 10:15, the copy pair 2 finishes differential copy, leaving only one copy pair where differential copy is being executed. The differential data copy rate of the copy pair 3 is now 10 MB per minute, which means that the differential data amount of the copy pair 3 decreases by 10 MB per minute. The copy pair 3 finishes differential copy at 11:00.

The simulation lasts until a length of time set as the simulation time 7002 passes since the simulation start time, and continues until no copy pair with the completion check unnecessary flag attached is left. A time zone in which differential copy takes place is calculated for each copy pair in this manner.

Given above is a description of FIG. 12 (specifics of the processing executed by the setting program 1251 and shown in FIG. 11).

Described next is secondary volume relocation processing which is executed by the setting program 1251 in order to finish differential copy processing within an acceptable differential copy time specified by the user.

FIG. 13 is a flow chart showing processing of managing copy pairs such that differential copy is finished within an acceptable differential copy time according to the first embodiment of this invention.

This processing is activated by the user. A parameter specified by the user for this processing is the application ID of an application program for which the processing is performed. First, the setting program 1251 is activated and stands by for a period of time (e.g., five minutes) set as the differential copy processing time maintaining processing cycle 7001 of FIG. 7 (Step 13010). Next, the setting program 1251 refers to the parity group information 1253 to identify parity groups whose volumes are used exclusively as secondary volumes (Step 13020). Subsequently, the setting program 1251 repeats processing as many times as the count of the identified parity groups (Step 13030).

First, the setting program 1251 identifies a differential copy processing time zone for each copy pair whose secondary volume is one of the logical volumes of the parity group that is being processed (Step 13050). Step 13050 is the same as the processing shown in FIG. 11, and a description on the specifics will be omitted here.

Next, the setting program 1251 checks whether or not the copy pairs whose differential copy processing time zones have been identified include a copy pair that does not finish differential copy within the acceptable differential copy time (Step 13060).

When it is found in Step 13060 that none of the copy pairs fails to finish differential copy within the time limit, the setting program 1251 moves to Step 13030 in order to process the next parity group.

When a copy pair that does not finish differential copy within the time limit is found in Step 13060, the setting program 1251 determines which secondary volume is to be relocated (which secondary volume needs to migrate) (Step 13070). Here, the secondary volume of a copy pair that starts differential copy latest is to be relocated. How a secondary volume to be relocated is determined can be changed to suit the needs and, for example, a secondary volume that has the smallest capacity 3004 may be chosen.

Next, the setting program 1251 identifies candidates for the secondary volume migration destination (Step 13080). Here, the setting program 1251 temporarily creates a temporary copy pair, which is a copy pair whose secondary volume is an unused logical volume serving as the migration destination, and uses the processing shown in FIG. 10 to identify candidates for the secondary volume migration destination.

Then, the setting program 1251 judges whether or not there is a candidate for the secondary volume migration destination (Step 13090). When no candidate for the secondary volume migration destination is found in Step 13090, the setting program 1251 notifies the user of the fact (Step 13100), and moves to Step 13130. Notified of the fact, the user deals with the situation by, for example, creating a new parity group. Alternatively, when no candidate for the secondary volume migration destination is found, the setting program 1251 may return to Step 13070 in order to choose a different volume as the secondary volume to be migrated.

When at least one candidate for the secondary volume migration destination is found in Step 13090, the setting program 1251 determines a candidate for the secondary volume migration destination (Step 13110). Here, a logical volume that has the smallest logical volume identifier is determined as the migration destination. How a logical volume to serve as the migration destination is determined may be changed to suit the needs and, for example, a logical volume of a parity group that has more secondary volumes than other parity groups do may be chosen as the migration destination as a power-saving measure.

Thereafter, the setting program 1251 instructs the control program 1028 to execute the secondary volume migration (Step 13120). The secondary volume migration is accompanied by an update of the copy pair information 1257 which is executed by the setting program 1251 to update information on the secondary volume. The setting program 1251 then returns to Step 13050 to check if, now that the secondary volume has migrated to another parity group, every copy pair whose secondary volume is one of the logical volumes of this parity group finishes differential copy within an acceptable differential copy time specified by the user.

After repeating Steps 13030 to 13130 as many times as the count of the identified parity groups, the setting program 1251 returns to Step 13010 and stands by until it is time to start the next round of processing. The above is the secondary volume relocation (migration) processing for finishing differential copy processing within an acceptable differential copy time specified by the user. In this way, the copy pair configuration can be managed during backup operation such that differential copy processing is finished within an acceptable differential copy time specified by the user.

As has been described, according to the first embodiment, the setting program 1251 presents candidates of the secondary volume of a parity group that allow existing copy pairs and a new copy pair to finish differential copy processing within their respective acceptable differential copy times specified by the user. The user can thus create a copy pair that finishes differential copy processing within an acceptable differential copy time specified.

Further, the setting program 1251 regularly calculates the differential copy processing time of each copy pair and, when the calculation finds that a copy pair will fail to finish differential copy within its specified acceptable differential copy time, makes the secondary volume of this copy pair migrate to another parity group so that differential copy is finished within the acceptable differential copy time. Copy pair management that enables each copy pair to finish differential copy within its specified acceptable differential copy time is thus accomplished.

The backup policy information 1256, which is stored in the memory 1250 of the management computer 1200 in the first embodiment, may instead be stored in the memory 1160 of the host computer 1100, or a memory of another computer (not shown). In this case, however, the backup agent 1162, or a similar program, needs to have a function of collecting the backup policy information 1256 and to notify the setting program 1251 of the backup policy upon request from the setting program 1251.

Second Embodiment

Described next is a second embodiment of this invention.

In the second embodiment, the backup start time (time at which data backup is started) is shifted to an earlier or later time point so that a copy pair whose secondary volume is one of the logical volumes of a specific parity group finishes differential copy within an acceptable differential copy time specified. The method of the second embodiment will be described below.

System Configuration of the Second Embodiment

The configuration of a computer system according to the second embodiment is the same as that of the computer system according to the first embodiment. The following description is therefore about major processing differences between the first and second embodiments.

Figure 14:
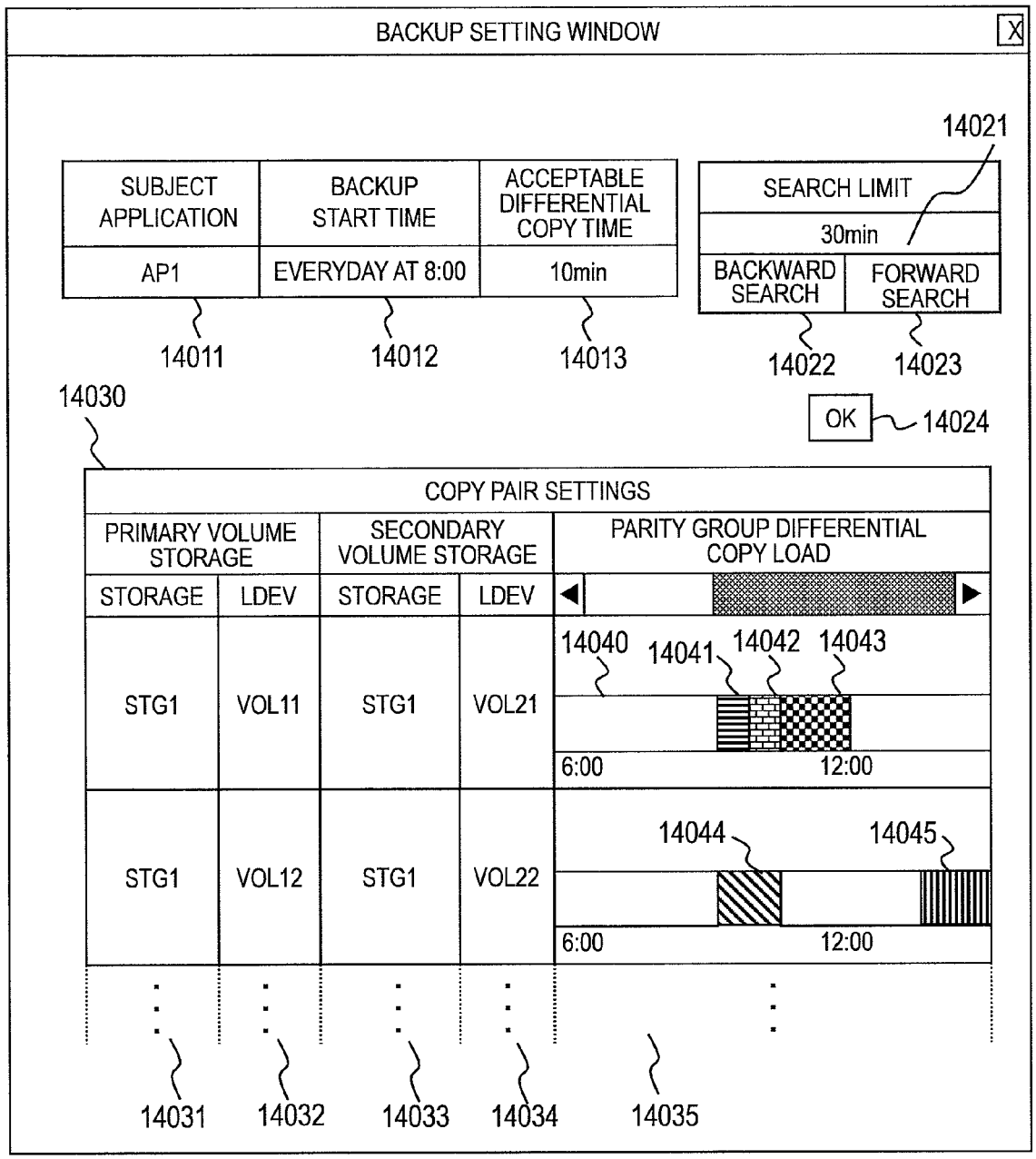
FIG. 14 is an explanatory diagram showing an example of a window for setting a backup environment in accordance with the first embodiment of this invention.

FIG. 14 is an explanatory diagram showing an example of a window for setting a backup environment according to the second embodiment of this invention.

Shown in FIG. 14 is a configuration example of a GUI that is displayed by the setting program 1251 when the user sets a backup environment. A text field 14011 is a text field in which the user enters the ID of an application program for which backup settings are set (subject application program). A text field 14012 is similar to the text field 8011 of FIG. 8 and is a text field in which the user enters a backup start time (time at which data backup is to be started). A text field 14013 is similar to the text field 8012 of the backup setting window shown in FIG. 8, and is a text field in which the user enters an acceptable differential copy time. Specifically, a value such as "10 min." which indicates ten minutes is entered in the text field 14013.

A text field 14021 shows the maximum length of time by which the backup start time in a simulation can be moved back or ahead from a backup start time entered in the text field 14012 in a search for a backup start time that ensures that differential copy is finished within an acceptable differential copy time. Specifically, the user enters a value such as "30 min." which indicates thirty minutes is entered in the text field 14021.

A button 14022 is for instructing the setting program 1251 to conduct a search with the backup start time in a simulation shifted to a time point earlier than a backup start time entered in the text field 14012. A button 14023 is for instructing the setting program 1251 to conduct a search with the backup start time in a simulation shifted to a time point later than a backup start time entered in the text field 14012. Operating the button 14022 or the button 14023 activates the setting program 1251, which then executes backup start time search processing. The backup start time search processing will be described later with reference to FIGS. 15 and 16.

A list 14030 is for setting copy pairs that are used by an application program entered in the text field 14011. The list 14030 contains column fields for storage 14031 and an LDEV 14032. When an application ID is entered in the text field 14011, the setting program 1251 obtains from the application information 1255 information on logical volumes that are used by the entered application program, and displays the obtained information on the logical volumes in the column fields for the storage 14031 and the LDEV 14032. The storage 14031 indicates the identifier of a storage system to which a logical volume serving as the primary volume of a copy pair belongs. The LDEV 14032 indicates the identifier of this logical volume serving as the primary volume.

The list 14030 also contains fields for storage 14033 and an LDEV 14034. The identifier of a storage system to which a logical volume serving as the secondary volume of a copy pair belongs is entered as the storage 14033. The identifier of this logical volume serving as the secondary volume is entered as the LDEV 14034. Values in the fields for the storage 14033 and the LDEV 14034 are entered by the user.

The list 14030 further contains a field for a parity group differential copy load 14035. The parity group differential copy load 14035 is information about a copy pair that has as the primary volume a logical volume indicated by the storage 14031 and the LDEV 14032 and as the secondary volume a logical volume indicated by the storage 14033 and the LDEV 14034 (this copy pair is referred to as "temporary copy pair" as in the description of FIG. 10). A stacked horizontal bar graph indicating a time zone in which the load applies to a parity group to which the secondary volume of this copy pair belongs is displayed as the parity group differential copy load 14035.

A bar in the stacked horizontal bar graph displayed as the parity group differential copy load 14035 is a combination of six patterns and its horizontal axis represents time. A pattern 14040 represents a time zone in which differential copy does not take place in this parity group. A pattern 14044 represents a time zone in which differential copy is executed in a temporary copy pair and is finished within an acceptable differential copy time. A pattern 14045 represents a time zone in which differential copy is executed in an existing copy pair and is finished within an acceptable differential copy time. A pattern 14041 represents a time zone in which differential copy is executed in a temporary copy pair and is not finished within an acceptable differential copy time. A pattern 14043 represents a time zone in which differential copy is executed in an existing copy pair and is not finished within an acceptable differential copy time. A pattern 14042 represents a time zone where the pattern 14041 and the pattern 14043 overlap (namely, time zone in which differential copy takes place in the temporary copy pair and the existing copy pair both).

When the text field 14012, the text field 14013, the storage 14031, the LDEV 14032, the storage 14033, and the LDEV 14034 are set appropriately, a stacked horizontal bar graph calculated by the setting program 1251 is displayed in the field for the parity group differential copy load 14035. The bar graph spans a length of time specified as the simulation time 7002 from the current time. In the case where the bar graph is too large to be displayed in entirety in the window, a scroll bar or the like can be employed to switch the displayed time zone. The parity group differential copy load 14035, which is displayed in the form of a stacked horizontal bar graph in the second embodiment, may instead be a sequential line graph of the differential data amount as the one shown in FIGS. 12B to 12D.

While the sequential line graphs of FIGS. 12B to 12D show the differential data amount on a copy pair basis, a sequential line graph as the parity group differential copy load 14035 has to show an accumulation of differential data amounts of copy pairs whose secondary volumes are logical volumes that belong to a single parity group.

An OK button 14024 is for instructing the setting program 1251 to create copy pairs on the list 14030. The OK button 14024 is activated when the pattern 14041, the pattern 14042, and the pattern 14043 are not displayed in the field for the parity group differential copy load 14035 (in other words, in the case where every copy pair belonging to the parity group in question finishes differential copy within an acceptable differential copy time).

Figure 15:
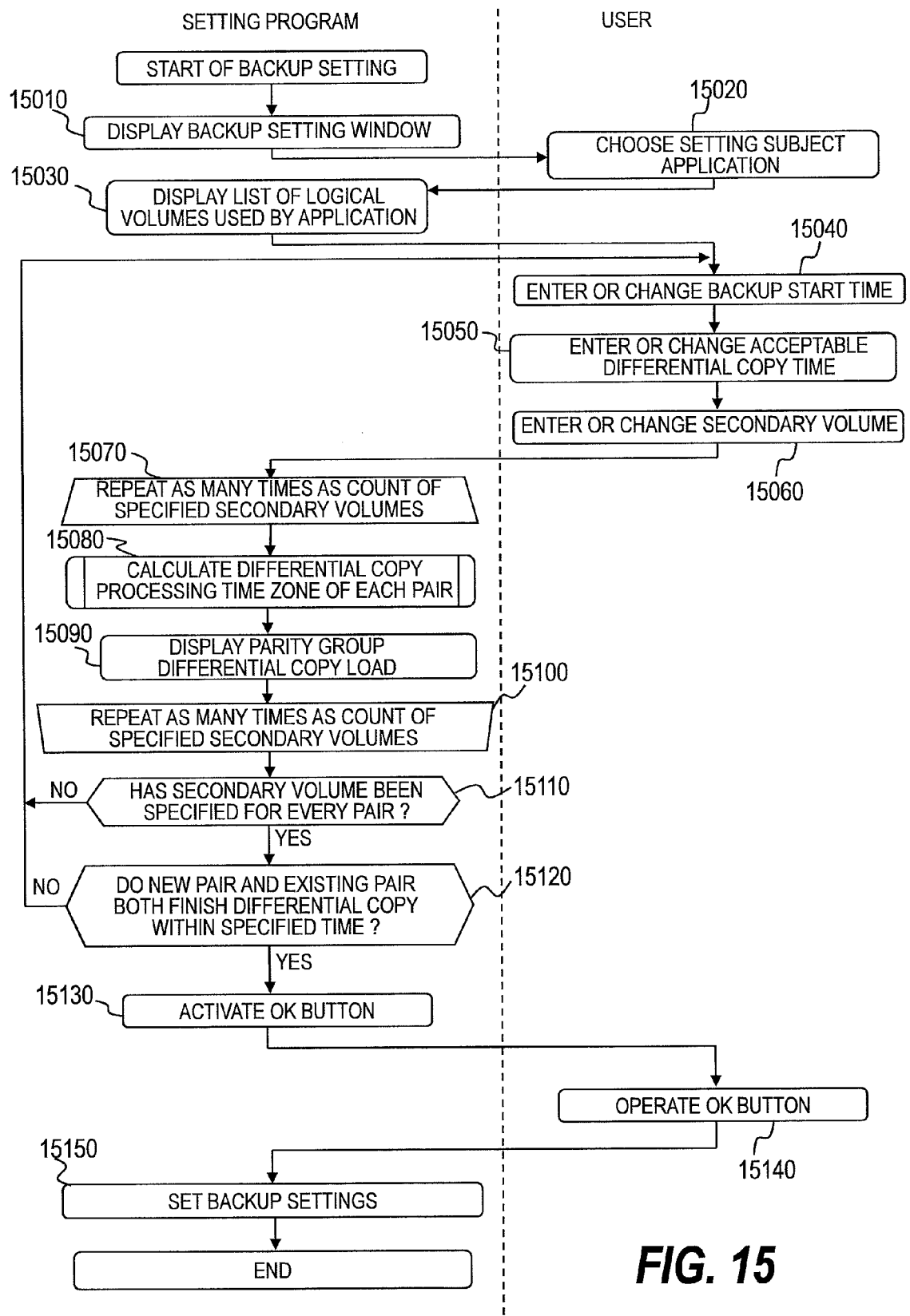
FIG. 15 is a flow chart showing processing of setting a backup environment in accordance with the first embodiment of this invention.

FIG. 15 is a flow chart showing processing of setting a backup environment according to the second embodiment of this invention.

First, the setting program 1251 is activated and displays the backup setting window shown in FIG. 14 (Step 15010). Next, the user enters the application ID of an application program to which backup settings are set in the text field 14011 of the backup setting window (Step 15020). The setting program 1251 obtains from the application information 1255 information about logical volumes that are used by the application program identified by the entered application ID, and displays the obtained information in the list 14030 of the backup setting window (Step 15030).

Next, the user sets a backup start time in the text field 14012 of the backup setting window, or changes a value already entered in the text field 14012 (Step 15040). The user also enters an acceptable differential copy time in the text field 14013 of the backup setting window, or changes a value already entered in the text field 14013 (Step 15050). As the storage 14033 and LDEV 14034 of the backup setting window, the user enters information on a logical volume that serves as a secondary volume, or changes already entered values (Step 15060).

Next, the setting program 1251 repeats Steps 15080 and 15090 as many times as the count of the secondary volumes indicated by the storage 14033 and LDEV 14034 of the backup setting window (Step 15070).

The setting program 1251 calculates a differential copy processing time zone for each copy pair in the manner described with reference to FIG. 11 (Step 15080). Based on the results of the calculation, the setting program 1251 displays a stacked horizontal bar graph as the parity group differential copy load 14035 of the backup setting window (Step 15090).

Then, the setting program 1251 checks whether or not a secondary volume has been assigned to every primary volume that is indicated by the storage 14031 and LDEV 14032 of the backup setting window (Step 15110).

When it is found in Step 15110 that not all of the primary volumes have been assigned a secondary volume, the setting program 1251 returns to Step 15040.

When it is found in Step 15110 that a secondary volume has been assigned to every primary volume, the setting program 1251 checks whether or not every copy pair finishes differential copy within an acceptable differential copy time based on the results of the calculation of Step 15080 (Step 15120).

When it is found in Step 15120 that not all of the copy pairs finish differential copy within the time limit, the setting program 1251 returns to Step 15040.

When it is found in Step 15120 that every copy pair finishes differential copy within the time limit, the setting program 1251 activates the OK button 14024 (Step 15130).

Next, in the case where it is all right to create copy pairs on the list 14030, the user operates the OK button 14024 (Step 15140). If the user wants to change copy pairs displayed in the list 14030, the user may return to Step 15040 to switch secondary volumes or other values (illustration of this procedure is omitted).

Lastly, the setting program 1251 executes backup environment setting processing as many times as the count of copy pairs to be created (count of primary volumes that are used by the application program) (Step 15150), and then ends the processing of FIG. 15. The backup environment setting processing in Step 15150 is the same as the one in Step 9100 of FIG. 9. The above is the processing executed by the setting program 1251 when the user sets a backup environment.

Figure 16:
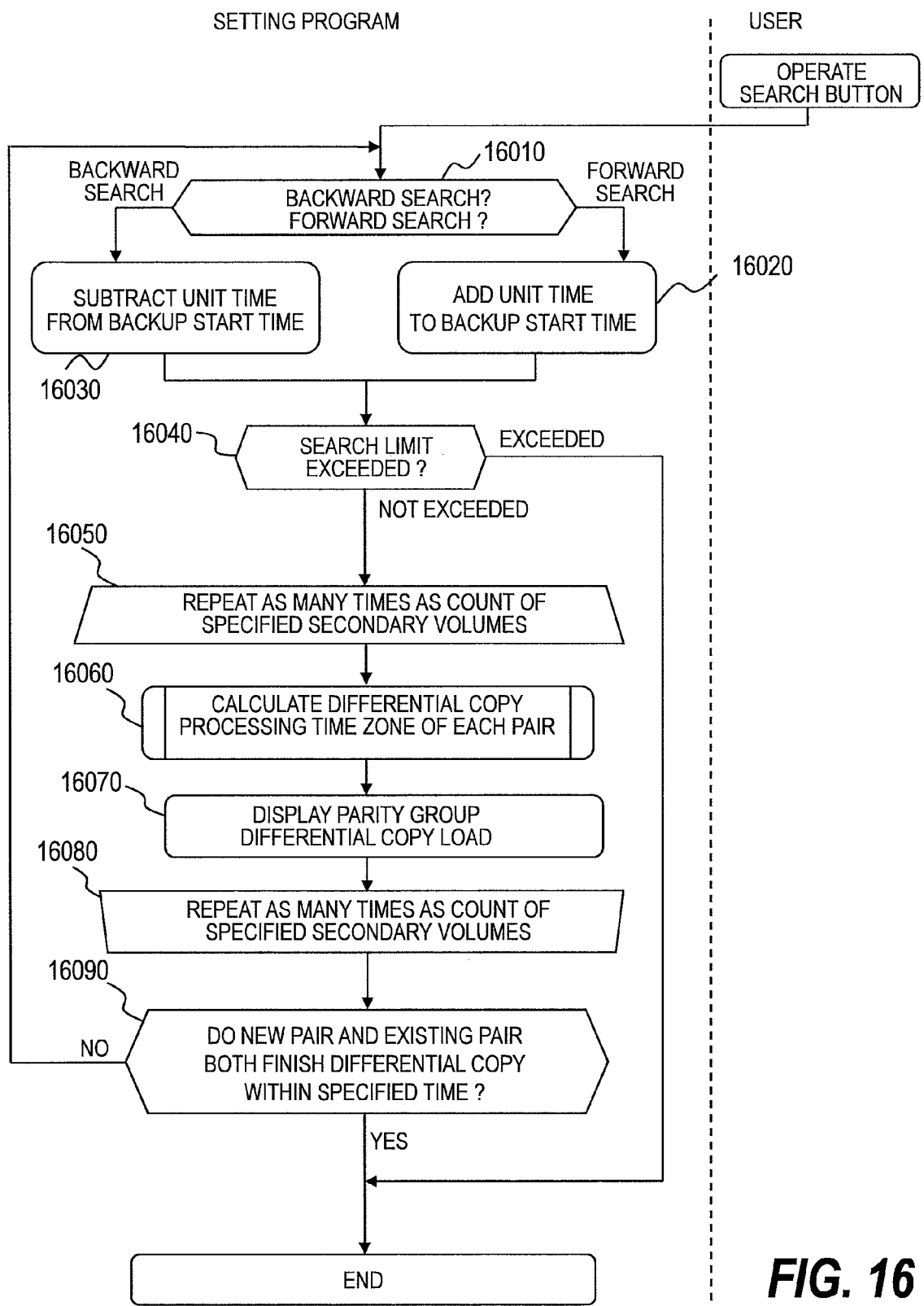
FIG. 16 is a flow chart showing processing of searching for a backup start time in accordance with a second embodiment of this invention.

FIG. 16 is a flow chart showing processing of searching for a backup start time according to the second embodiment of this invention.

First, the setting program 1251 judges whether the operated button is the button 14022 or the button 14023 (Step 16010). When it is the button 14022 that has been operated, the setting program 1251 shifts a backup start time entered in the text field 14012 by the unit time (e.g., one minute), which is determined in advance, to an earlier time point (Step 16030). For example, when the entered backup start time is "everyday at 8:00", the backup start time is changed to "everyday at 7:59".

When it is the button 14023 that has been operated, on the other hand, the setting program 1251 shifts a backup start time entered in the text field 14012 by the unit time (e.g., one minute), which is determined in advance, to a later time point (Step 16020). For example, when the entered backup start time is "everyday at 8:00", the backup start time is changed to "everyday at 8:01".

Then, the setting program 1251 proceeds to Step 16040. The unit time in Steps 16020 and 16030 is one minute in the second embodiment, but may be set otherwise.

In Step 16040, the setting program 1251 judges whether or not the time difference between the backup start time that has been entered in the text field 14012 before this search processing is started and the updated backup start time of Step 16030 or Step 16020 exceeds a search limit time entered in the text field 14021 (Step 16040).

When it is found in Step 16040 that the time difference exceeds the search limit time, the setting program 1251 ends the processing.

When it is found in Step 16040 that the time difference does not exceed the search limit time, the setting program 1251 repeats Steps 16060 and 16070 as many times as the count of records in the list 14030 where a secondary volume is assigned (Step 16050).

Next, the setting program 1251 calculates a differential copy processing time zone for each copy pair in a parity group to which the second volumes that are being processed belong in the manner described with reference to FIG. 11 (Step 16060). Based on the results of the calculation, the setting program 1251 displays a stacked horizontal bar graph as the parity group differential copy load 14035 in the backup setting window (Step 16070).

After executing Steps 16060 and 16070 for each record in the list 14030 where a secondary volume is assigned, the setting program 1251 checks whether or not every copy pair of the processed record finishes differential copy within an acceptable differential copy time (Step 16090).

When it is found in Step 16090 that every one of the copy pairs finishes differential copy within an acceptable differential copy time, the setting program 1251 ends the processing. When it is found in Step 16090 that not all of the copy pairs finish differential copy within an acceptable differential copy time, the setting program 1251 returns to Step 16010.

FIG. 16 (processing executed by the setting program 1251 when the button 14022 or 14023 of FIG. 14 is operated by the user) has now been described.

Figure 17:
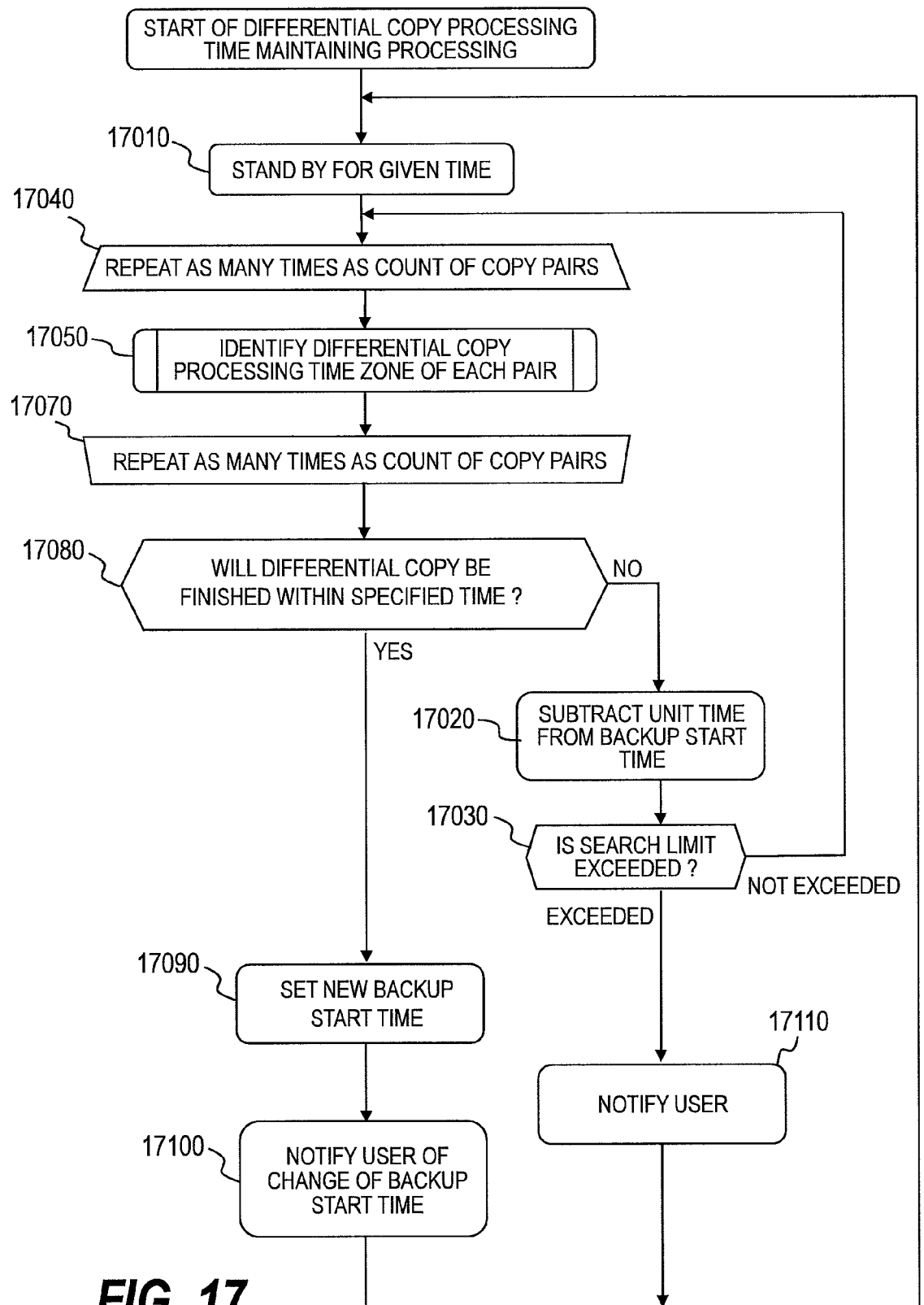
FIG. 17 is a flow chart showing processing of managing copy pairs such that differential copy is finished within an acceptable differential copy time in accordance with the second embodiment of this invention.

FIG. 17 is a flow chart showing processing of managing copy pairs such that differential copy is finished within an acceptable differential copy time according to the second embodiment of this invention.

The setting program 1251 changes the backup start time in order to finish differential copy processing within an acceptable differential copy time specified by the user. This processing is activated by the user. Parameters specified for this processing are the application ID of an application program for which the processing is performed, a backup start time of a backup operation in which the differential copy processing time is to be maintained, and a maximum time by which the start of differential copy can be moved up (search limit). The maximum time by which the start of differential copy can be moved up is specified in the form of a length of time, for example, "10 min.".

First, after activated, the setting program 1251 stands by for a length of time (e.g., five minutes) set as the differential copy processing time maintaining processing cycle 7001 of FIG. 7 (Step 17010). In Step 17050, the setting program 1251 identifies a differential copy processing time zone for each copy pair in the manner described with reference to FIG. 11. The setting program 1251 repeats Step 17050 as many times as the count of copy pairs where differential copy is executed at the backup start time of the application program. The setting program 1251 then checks whether or not every copy pair can finish differential copy within its specified acceptable differential copy time (Step 17080).

When it is found in Step 17080 that not all of the copy pairs finish differential copy within their respective time limits, the setting program 1251 moves to Step 17020. The setting program 1251 shifts a backup start time registered in the backup policy information 1256 by the unit time (e.g., one minute) to an earlier time point (Step 17020). Next, the setting program 1251 judges whether or not the difference between the backup start time that has been registered in the backup policy information 1256 when this processing is started and the backup start time that is currently registered in the backup policy information 1256 (namely, backup start time shifted to an earlier time point in Step 17020) exceeds the maximum time by which the start of differential copy can be moved up and which has been specified as a parameter (Step 17030).

When it is found in Step 17030 that the difference exceeds the specified maximum time, the setting program 1251 judges that the search has failed to come up with a backup start time that ensures the completion of differential copy within an acceptable differential copy time specified by the user, and notifies the user of the fact (Step 17110). The setting program 1251 then returns to Step 17010.

When it is found in Step 17030 that the difference does not exceed the specified maximum time, the setting program 1251 returns to Step 17040 to repeatedly execute Step 17050 based on the newly set backup start time (Step 17040).

When it is found in Step 17080 that every copy pair finishes differential copy within its acceptable differential copy time, the setting program 1251 registers the current backup start time in the backup policy information 1256 as a new backup start time (Step 17090). The setting program 1251 notifies the user of the change of the backup start time (Step 17100) and returns to Step 17010.

The above is the backup start time changing processing which is executed by the setting program 1251 in order to finish differential copy processing within an acceptable differential copy time specified by the user. In the second embodiment, the backup start time is shifted to an earlier time point in the search for a backup start time that ensures the completion of differential copy processing within an acceptable differential copy time specified by the user. Instead, the backup start time may be shifted to a later time point.

The time point to be changed is the backup start time in the second embodiment. An alternative method may be employed in which backup processing is divided into two parts: application stilling control and differential copy processing, and the primary volume and the secondary volume are synchronized with each other (mirrored state) with the start time of differential copy processing alone shifted to an earlier time point, whereas the time at which the application program is made quiescent and the time at which the synchronized state is canceled are left unchanged.

As has been described, according to the second embodiment, the setting program 1251 notifies the user of a backup start time that ensures that existing copy pairs and a new copy pair both finish differential copy within their respective specified acceptable differential copy times. The user can thus create a backup environment in which differential copy processing is finished within an acceptable differential copy time specified.

Further, the setting program 1251 regularly calculates the differential copy processing time of each copy pair and, when the calculation finds that a copy pair will fail to finish differential copy within its specified acceptable differential copy time, shifts the backup start time to an earlier time point so that differential copy is finished within the acceptable differential copy time. Copy pair management that enables each copy pair to finish differential copy within its specified acceptable differential copy time is thus accomplished.

Third Embodiment

Described next is a third embodiment of this invention.

In a computer system according to the third embodiment, a first storage system virtualizes logical volumes of a plurality of second storage systems (external storage) and provides the virtualized volumes to the host computer as logical volumes. An application program run on the host computer uses the logical volumes virtualized by the first storage system to conduct a business operation. The differential copy processing rate in this type of computer system may depend on the transfer rate of a data I/F that interconnects the first storage system and the second storage systems. The third embodiment enables this type of computer system to finish differential copy within an acceptable differential copy time. A description on the third embodiment will now be given.

System Configuration of the Third Embodiment

Figure 18:
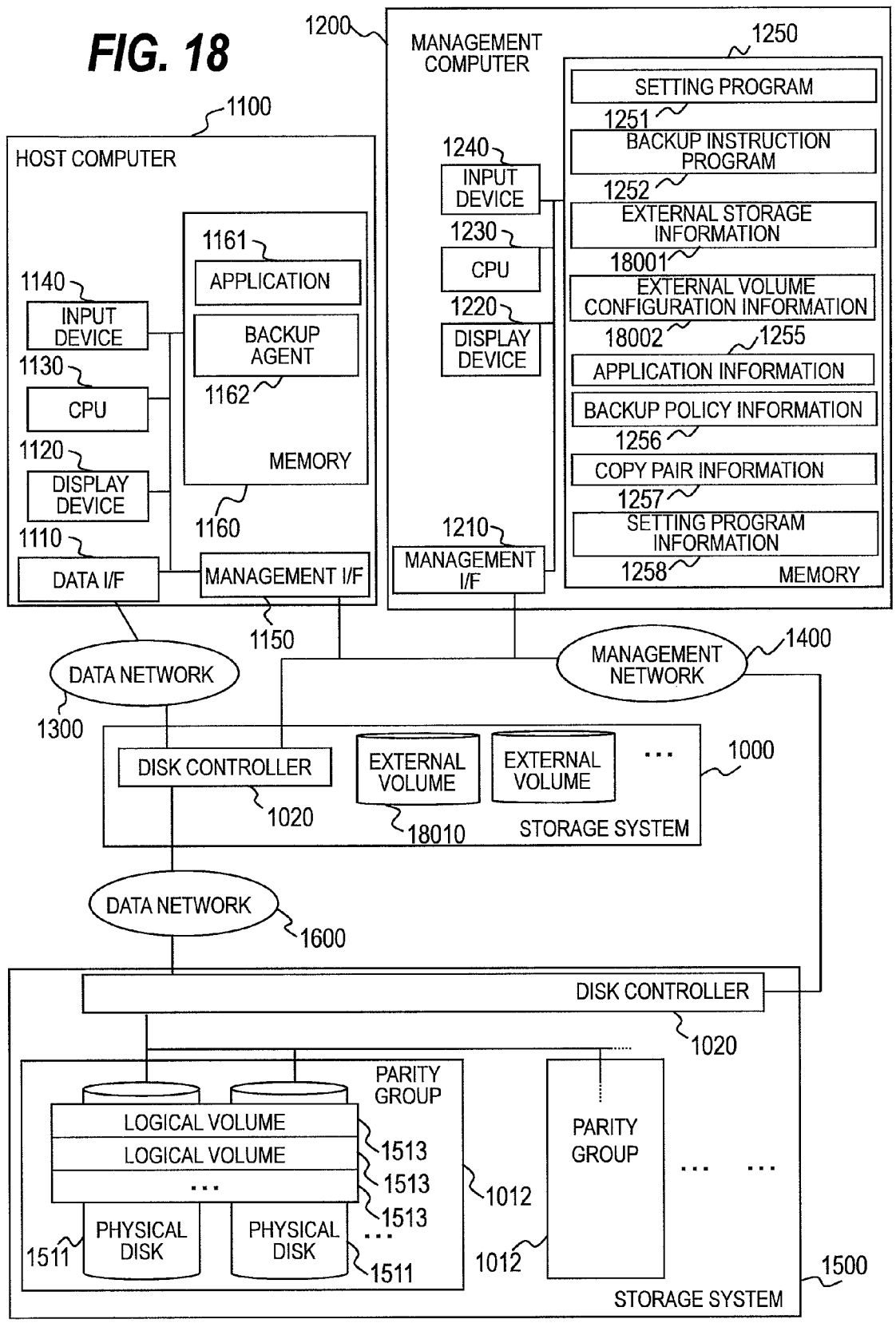
FIG. 18 is a block diagram showing a configuration example of the computer system in accordance with a third embodiment of this invention.

FIG. 18 is a block diagram showing a configuration example of the computer system according to the third embodiment of this invention.

The configuration of the computer system according to the third embodiment is mostly the same as that of the computer system according to the first embodiment, except that a storage system 1500 and a data network 1600 are added. In the example of FIG. 18, the storage system 1000 virtualizes logical volumes of the storage system 1500, which is external storage, and provides the virtualized logical volumes (external volumes 18010) to the host computer 1100. What follows is a description on major differences from the system configuration of the first embodiment.

In the computer system of the third embodiment, the storage system 1000 and the storage system 1500 are coupled to each other through the data network 1600. Interfaces of the storage system 1000 and the storage system 1500 to the data network 1600 are of the same type as the data I/F 1022 shown in FIG. 1. The data network 1600 is a storage area network (SAN) in the third embodiment, but may be an IP network or other data communication networks than the two. The data network 1600 and the data network 1300 may be one same network.

The control program 1028 of the storage system 1000 creates the external volumes 18010 which are virtual logical volumes. The external volumes 18010 are mapped to the logical volumes 1513 of the storage system 1500 on a one-on-one basis. Read/write commands and control commands directed to the external volumes 18010 are forwarded to the logical volumes 1513 of the storage system 1500 and processed within the storage system 1500.

The memory of the management computer 1200 stores external storage information 18001 in place of the parity group information 1253, and stores external volume configuration information 18002 in place of the logical volume configuration information 1254.

FIG. 19 is an explanatory diagram showing an example of the external storage information 18001 according to the third embodiment of this invention.

The configuration of the external storage information 18001 is mostly the same as that of the parity group information 1253 described with reference to FIG. 2. The difference is that a field for an external storage ID 19001 is added to the external storage information 18001 while fields for the storage ID 2001 and the parity group ID 2002 are removed. The external storage ID 19001 is an identifier unique to each storage system throughout the computer system of the third embodiment (the external storage ID 19001 in this example is "STG2", which is the identifier of the storage system 1500). The rest of the fields are for information about a storage system that is identified by the external storage ID 19001 uniquely throughout the computer system. A differential reception rate 19002 is the same as the differential reception rate 2003 of FIG. 2, and indicates the amount of differential data that can be received per unit time in data copy to the storage system. In the case where the differential reception rate depends on the transfer rate of the data I/F of the storage system, this transfer rate may be used as the amount of differential data that can be received per unit time. A use 19003 is the same as the use 2004 of FIG. 2, and indicates the use of logical volumes of the storage system.

FIG. 20 is an explanatory diagram showing an example of the external volume configuration information 18002 according to the third embodiment of this invention.

The configuration of the external volume configuration information 18002 is mostly the same as that of the logical volume configuration information 1254 shown in FIG. 3. The difference is that a field for an external storage ID 20001 is added to the external volume configuration information 18002 while a field for the parity group 3003 is removed. The external storage ID 20001 is the identifier of a storage system (storage system 1500) storing logical volumes (logical volumes 1513) to which virtual logical volumes (external volumes 18010 of the storage system 1000) identified by the logical VOL 3002 are mapped.

Processing executed by various programs in the third embodiment is the same as in the second embodiment, and a description thereof will be omitted here. In processing according to the third embodiment, however, parity groups to which logical volumes belong in processing according to the second embodiment are replaced with storage systems storing logical volumes to which virtual logical volumes are mapped.

As has been described, according to the third embodiment, in a computer system where logical volumes of an external storage system (the storage system 1500 in this example) are virtualized to be provided to a host computer, the setting program 1251 notifies the user of a backup start time that ensures that existing copy pairs and a new copy pair both finish differential copy within their respective specified acceptable differential copy times. The user can thus create a backup environment in which differential copy processing is finished within an acceptable differential copy time specified.

Further, the setting program 1251 regularly calculates the differential copy processing time of each copy pair and, when the calculation finds that a copy pair will fail to finish differential copy processing within its specified acceptable differential copy time, shifts the backup start time such that differential copy is finished within the acceptable differential copy time. Copy pair management that enables each copy pair to finish differential copy within its specified acceptable differential copy time is thus accomplished.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
at least one storage system which includes a plurality of first parity groups of a plurality of first logical volumes as a copy source and a plurality of second parity groups of a plurality of second logical volumes as a copy destination, and executes differential copy in a plurality of copy pairs having the plurality of first logical volumes and the plurality of second logical volumes;
a plurality of host computers which executes an application program that uses the plurality of first logical volumes; and
a management computer for managing the at least one storage system,
wherein the at least one storage system comprises an interface, disk drives coupled to the interface, a processor coupled to the interface, and a memory coupled to the processor,
wherein each of the plurality of host computers comprises an interface coupled to the at least one storage system, a processor coupled to the interface, and a memory coupled to the processor,
wherein the management computer comprises an interface coupled to the at least one storage system, a processor coupled to the interface, and a memory coupled to the processor,
wherein a data amount of differential copy that can be executed per unit time is determined for each of the plurality of second parity groups,
wherein the determined data amount of differential copy that can be executed per unit time is shared among copy pairs in each of the plurality of second parity groups, and
wherein the management computer is configured to:
manage differential copy start times and differential data amounts of the plurality of copy pairs, and manage for each of the plurality of second parity groups a data amount that can be copied in differential copy per unit time;
identify one of the plurality of copy pairs for which the differential copy is to be started and a start time of the differential copy;
subtract the data amount of differential copy per unit time that is allocated to the identified one of the plurality of copy pairs from a differential data amount of the identified one of the plurality of copy pairs, and add the unit time to the identified start time;
judge that the differential copy has been finished at a time when the subtracted differential data amount reaches zero or less;
calculate time zones in which the plurality of copy pairs execute differential copy based on the time at which the differential copy has been finished;
display the calculated time zones;
manage acceptable differential copy processing times of the plurality of copy pairs;
periodically calculate time zones in which the plurality of copy pairs execute differential copy;
judge whether the plurality of copy pairs finish the differential copy within the acceptable differential copy processing times; and
change one of a second logical volume as the copy destination of the at least one of the plurality of copy pairs which will fail to finish the differential copy to one of the plurality of second logical volumes in another one of the plurality of second parity groups, and the start time of the differential copy in a case of which at least one of the plurality of copy pairs will fail to finish the differential copy within the acceptable differential copy processing times.

2. A computer system, comprising:
at least one storage system which includes a first storage area group of a plurality of first storage areas as a copy source and at least one second storage area group of a plurality of second storage areas as a copy destination, and executes differential copy in at least one first pair having the plurality of first storage areas and the plurality of second storage areas; and
a management computer which manages the at least one storage system, wherein the at least one storage system comprises an interface, storage devices coupled to the interface, a processor coupled to the interface, and a memory coupled to the processor, wherein the management computer comprises an interface coupled to the at least one storage system, a processor coupled to the interface, and a memory coupled to the processor, wherein the plurality of first storage areas are used by an application program executed by a host computer, wherein a data amount of differential copy that can be executed per unit time is determined for the at least one second storage area group, wherein the determined data amount of differential copy that can be executed per unit time is shared among first pairs in the at least one second storage area group, and wherein the management computer is configured to:

manage differential copy start times and differential data amounts of the first pairs, and manage for the at least one second storage area group a data amount that can be copied in differential copy per unit time;

identify one of the first pairs for which the differential copy is to be started and a start time of the differential copy;

subtract the data amount of differential copy per unit time that is allocated to the identified one of the first pairs from a differential data amount of the identified one of the first pairs, and add the unit time to the identified start time;

judge that the differential copy has been finished at a time when the subtracted differential data amount reaches zero or less; and calculate time zones in which the first pairs execute differential copy based on the time at which differential copy has been finished.

3. The computer system according to claim 2,
wherein the management computer is further configured to:
manage an acceptable differential copy processing time of the at least one first pair;
periodically calculate a time zone in which the at least one first pair executes differential copy;
judge whether the at least one first pair finishes the differential copy within the acceptable differential copy processing time; and
change a second storage area that serves as the copy destination of the at least one first pair which will fail to finish the differential copy to one of the plurality of second storage areas in another second storage area group in a case of which the at least one first pair will fail to finish the differential copy within the acceptable differential copy processing time.

4. The computer system according to claim 2,
wherein the management computer is further configured to:
manage an acceptable differential copy processing time of the at least one first pair;
periodically calculate a time zone in which the at least one first pair executes differential copy;
judge whether the at least one first pair finishes the differential copy within the acceptable differential copy processing time;
judge whether the first pair finishes the differential copy within the acceptable differential copy processing time; and
change the start time of the differential copy in a case of which the at least one first pair will fail to finish the differential copy within the acceptable differential copy processing time.

5. The computer system according to claim 2,
wherein the management computer is further configured to:
select a second pair which has as a copy destination one of the plurality of second storage areas constituting the at least one second storage area group;
calculate time zones in which the at least one first pair and the second pair execute differential copy;
judge whether the at least one first pair and the second pair finish the differential copy within the acceptable differential copy processing time; and
present the plurality of second storage areas of the second pair as the copy destination in a case of which the at least one first pair and the second pair finish the differential copy within the acceptable differential copy processing time.

6. The computer system according to claim 2,
wherein the management computer is further configured to:
select a second pair which has as a copy destination one of the plurality of second storage areas constituting the at least one second storage area group;
calculate time zones in which the at least one first pair and the second pair execute differential copy;
judge whether the at least one first pair and the second pair finish the differential copy within the acceptable differential copy processing time;
change the start time of the differential copy of the second pair, and then calculate time zones in which the at least one first pair and the second pair execute differential copy in a case of which at least one of the at least one first pair and the second pair will fail to finish the differential copy within the acceptable differential copy processing time;
calculate a start time of the differential copy that ensures that the at least one first pair and the second pair finish the differential copy within the acceptable differential copy processing time; and
present the calculated start time.

7. A data management method of managing data stored in a storage system, which is executed by a management computer, the storage system having a first storage area group of a plurality of first storage areas as a copy source and at least one second storage area group of a plurality of second storage areas as a copy destination, the storage system executing differential copy in at least one first pair having the plurality of first storage areas and the plurality of second storage areas, the management computer having an interface coupled to the storage system, a processor coupled to the interface, and a memory coupled to the processor, the at least one second storage area group having a determined data amount of differential copy that can be executed per unit time, the determined data amount of differential copy that can be executed per unit time being shared among first pairs in the at least one second storage area group, the method comprising steps of:

managing differential copy start times and differential data amounts of the first pairs, and managing for the at least one second storage area group a data amount that can be copied in differential copy per unit time;

identifying one of the first pairs for which the differential copy is to be started and a start time of the differential copy;

subtracting the data amount of differential copy per unit time that is allocated to the identified one of the first pairs from a differential data amount of the identified one of the first pairs, and adding the unit time to the identified start time;

judging that the differential copy has been finished at a time when the subtracted differential data amount reaches zero or less; and calculating time zones in which the first pairs execute differential copy based on the time at which differential copy has been finished.

8. The data management method according to claim 7, further comprising steps of:

managing an acceptable differential copy processing time of the at least one first pair;

periodically calculating a time zone in which the at least one first pair executes differential copy;

judging whether the at least one first pair finishes the differential copy within the acceptable differential copy processing time; and changing a second storage area that serves as the copy destination of the at least one first pair which will fail to finish the differential copy to one of the plurality of second storage areas in another second storage area group in a case of which the at least one first pair will fail to finish the differential copy within the acceptable differential copy processing time.

9. The data management method according to claim 7, further comprising step of:

managing an acceptable differential copy processing time of the at least one first pair;

periodically calculating a time zone in which the at least one first pair executes differential copy; and judging whether the at least one first pair finishes the differential copy within the acceptable differential copy processing time; and changing the start time of the differential copy in a case of which the at least one first pair will fail to finish differential copy within the acceptable differential copy processing time.

10. The data management method according to claim 7, further comprising step of:

selecting a second pair which has as a copy destination one of the plurality of second storage areas constituting the at least one second storage area group;

calculating time zones in which the at least one first pair and the second pair execute differential copy;

judging whether the at least one first pair and the second pair finish the differential copy within the acceptable differential copy processing time; and presenting the plurality of second storage areas of the second pair as the copy destination in a case of which the at least one first pair and the second pair finish the differential copy within the acceptable differential copy processing time.

11. The data management method according to claim 7, further comprising step of:

selecting a second pair which has as a copy destination one of the plurality of second storage areas constituting the at least one second storage area group;

calculating time zones in which the at least one first pair and the second pair execute differential copy;

judging whether the at least one first pair and the second pair finish the differential copy within the acceptable differential copy processing time;

changing the start time of the differential copy of the second pair, and then calculating time zones in which the at least one first pair and the second pair execute differential copy in a case of which at least one of the at least one first pair and the second pair will fail to finish the differential copy within the acceptable differential copy processing time;

calculating a start time of the differential copy that ensures that the at least one first pair and the second pair finish the differential copy within the acceptable differential copy processing time; and presenting the calculated start time.

* * * * *